(12) United States Patent
    Kim

(10) Patent No.: US 12,683,187 B2
(45) Date of Patent: Jul. 14, 2026

(54) HIGH ENERGY SOLID-STATE BATTERIES AND METHODS OF MAKING THE SAME

(71) Applicant: WATTRII, INC., Cedar Park, TX (US)

(72) Inventor: Jangwoo Kim, San Marcos, TX (US)

(73) Assignee: WATTRII, INC., Austin, TX (US)

( * ) Notice: Subject to any disclaimer, the term of this patent is extended or adjusted under 35 U.S.C. 154(b) by 261 days.

(21) Appl. No.: 17/932,596

(22) Filed: Sep. 15, 2022

(65) Prior Publication Data

US 2024/0097182 A1     Mar. 21, 2024

(51) Int. Cl.
    *H01M 10/0562*     (2010.01)
    *H01M 4/134*       (2010.01)
    *H01M 4/66*        (2006.01)
    *H01M 10/0525*     (2010.01)

(52) U.S. Cl.
    CPC ....... *H01M 10/0562* (2013.01); *H01M 4/134* (2013.01); *H01M 4/661* (2013.01); *H01M 10/0525* (2013.01); *H01M 2300/008* (2013.01)

(58) Field of Classification Search
    CPC ......... H01M 10/0562; H01M 10/0525; H01M 4/134; H01M 4/131; H01M 4/366; H01M 4/525; H01M 4/505; H01M 4/661; H01M 4/133
    See application file for complete search history.

(56) References Cited

U.S. PATENT DOCUMENTS 9,054,383 B2    6/2015  Roev et al.
9,306,213 B2    4/2016  Tsunozaki et al.

9,960,451 B1     5/2018   Zhamu et al.
10,033,030 B1    7/2018   Vajo et al.
10,608,284 B2    3/2020   Rustomji et al.
11,380,893 B1    7/2022   Kim
2012/0021303 A1  1/2012   Amendola et al.
2012/0183853 A1  7/2012   Chu et al.
2013/0302688 A1  11/2013  Takezawa
2014/0170465 A1  6/2014   Visco et al.
2017/0077564 A1  3/2017   Wang et al.
2017/0110701 A1  4/2017   Shi et al.
2017/0207449 A1  7/2017   Kang et al.
2018/0006306 A1  1/2018   Zhu et al.
2018/0079865 A1* 3/2018   Pyun ................... H01M 4/5815
2018/0261842 A1  9/2018   Park et al.

(Continued)

FOREIGN PATENT DOCUMENTS

EP        3118916  A1    1/2017

OTHER PUBLICATIONS

Xiao et al. "Electrolyte melt infiltration for scalable manufacturing of inorganic all-solid-state lithium-ion batteries" Nature Materials, (Mar. 8, 2021) available at https://www.nature.com/articles/s41563-021-00943-2.

*Primary Examiner* — Osei K Amponsah

(74) *Attorney, Agent, or Firm* — Raven Patents, LLC; Anton E. Skaugset

(57)     ABSTRACT

Solid-state batteries that include an electrolyte, having an electrolyte material, where at least a portion of the electrolyte material is solid, and the solid portion of the electrolyte material includes a first chlorine compound, and a cathode that is in contact with the electrolyte, the cathode including a cathode active material, and where the cathode active material includes a second chlorine compound. The batteries can be economically packed and can provide high energy density.

15 Claims, 8 Drawing Sheets

(56) References Cited

U.S. PATENT DOCUMENTS

2019/0372104 A1     12/2019 Nose
2019/0386337 A1     12/2019 Zhamu et al.
2021/0296691 A1*     9/2021 Kwon ................... H01M 4/661
2021/0359338 A1*    11/2021 Duggal ............. H01M 10/0562
2022/0093922 A1      3/2022 Kim

* cited by examiner

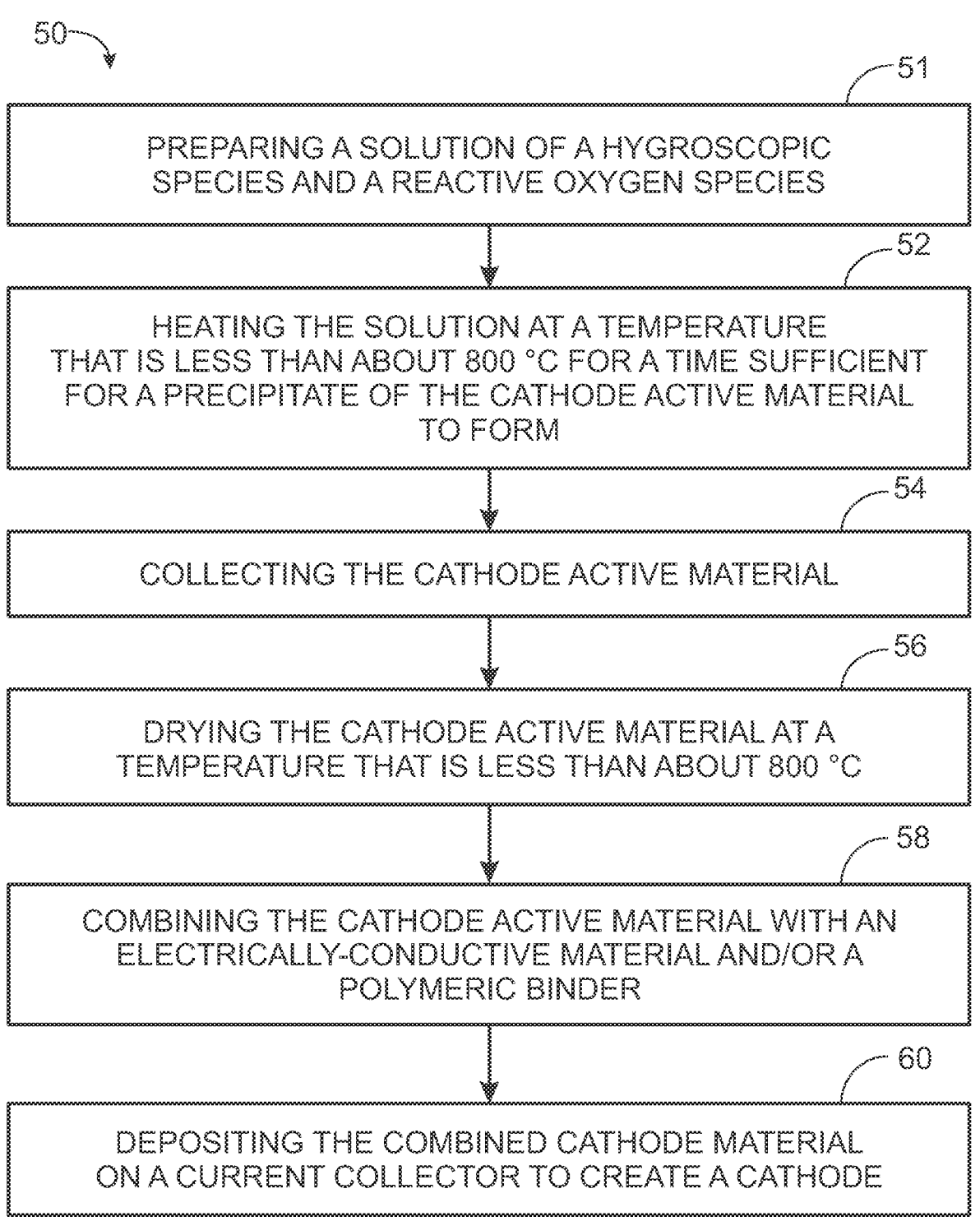

50

51
PREPARING A SOLUTION OF A HYGROSCOPIC
SPECIES AND A REACTIVE OXYGEN SPECIES

52
HEATING THE SOLUTION AT A TEMPERATURE
THAT IS LESS THAN ABOUT 800 °C FOR A TIME SUFFICIENT
FOR A PRECIPITATE OF THE CATHODE ACTIVE MATERIAL
TO FORM

54
COLLECTING THE CATHODE ACTIVE MATERIAL

56
DRYING THE CATHODE ACTIVE MATERIAL AT A
TEMPERATURE THAT IS LESS THAN ABOUT 800 °C

58
COMBINING THE CATHODE ACTIVE MATERIAL WITH AN
ELECTRICALLY-CONDUCTIVE MATERIAL AND/OR A
POLYMERIC BINDER

60
DEPOSITING THE COMBINED CATHODE MATERIAL
ON A CURRENT COLLECTOR TO CREATE A CATHODE

Fig. 3

HIGH ENERGY SOLID-STATE BATTERIES AND METHODS OF MAKING THE SAME

TECHNICAL FIELD

This disclosure relates generally to high energy solid-state batteries and methods of manufacturing the solid-sate batteries, the batteries including electrolytes that include solid-state electrolyte material, and cathodes that include cathode active materials.

BACKGROUND

Batteries are ubiquitous in modern technology, being used in a wide range of applications from small batteries for industrial and medical devices, to larger batteries for electric vehicles and grid energy storage systems. Perhaps the most well-known and widely-used battery technology at the present are lithium-ion batteries, which use an intercalated lithium compound as one electrode material and employ lithium ions shuttling between the cathode and anode in the pond of electrolyte. While lithium-ion batteries possess many advantages, they provide relatively low energy densities, and may require expensive materials for manufacture.

Solid-state batteries are often considered to be the future of lithium-ion battery technology. At least in theory, solid-state batteries can outperform today's lithium-ion batteries in many aspects, including safety and energy density. In practice, however, such batteries are yet too expensive to manufacture in order to achieve better safety and greater energy density than the conventional lithium-ion batteries. The first generation all-solid-state batteries include a solid-state electrolyte. Despite the high ionic conductivity and low grain boundary resistance of such solid-state electrolytes, they may require a large amount of stack pressure (i.e. greater than 10 MPas) and extremely dry manufacturing environments (i.e. a dew point of less than −60° C.), and the properties of the solid-state electrolyte materials themselves can make it difficult to transform them into freestanding thin films with thicknesses of less than 20 μm.

What is needed are improved solid-state batteries including a cathode and an electrolyte material that are highly compatible with each other, and which can provide greater energy density (>500 Wh/kg), more economical manufacturing costs, and lower materials costs, while at the same time exhibiting greater electrochemical reversibility, prolonged cycle life, and reduced risk of fire and explosion.

SUMMARY

The present disclosure is directed to solid-state batteries having an electrolyte and a cathode. The electrolyte includes an electrolyte material, where at least a portion of the electrolyte material is solid, and the solid portion of the electrolyte material includes a first chlorine compound. The cathode is in contact with the electrolyte, and the cathode includes a cathode active material that includes a second chlorine compound.

The disclosed features, functions, and advantages of the disclosed batteries, cathodes, and cathode active materials, may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a flowchart of an illustrative method of manufacturing a cathode according to the present disclosure.

DETAILED DESCRIPTION

Figure 1:
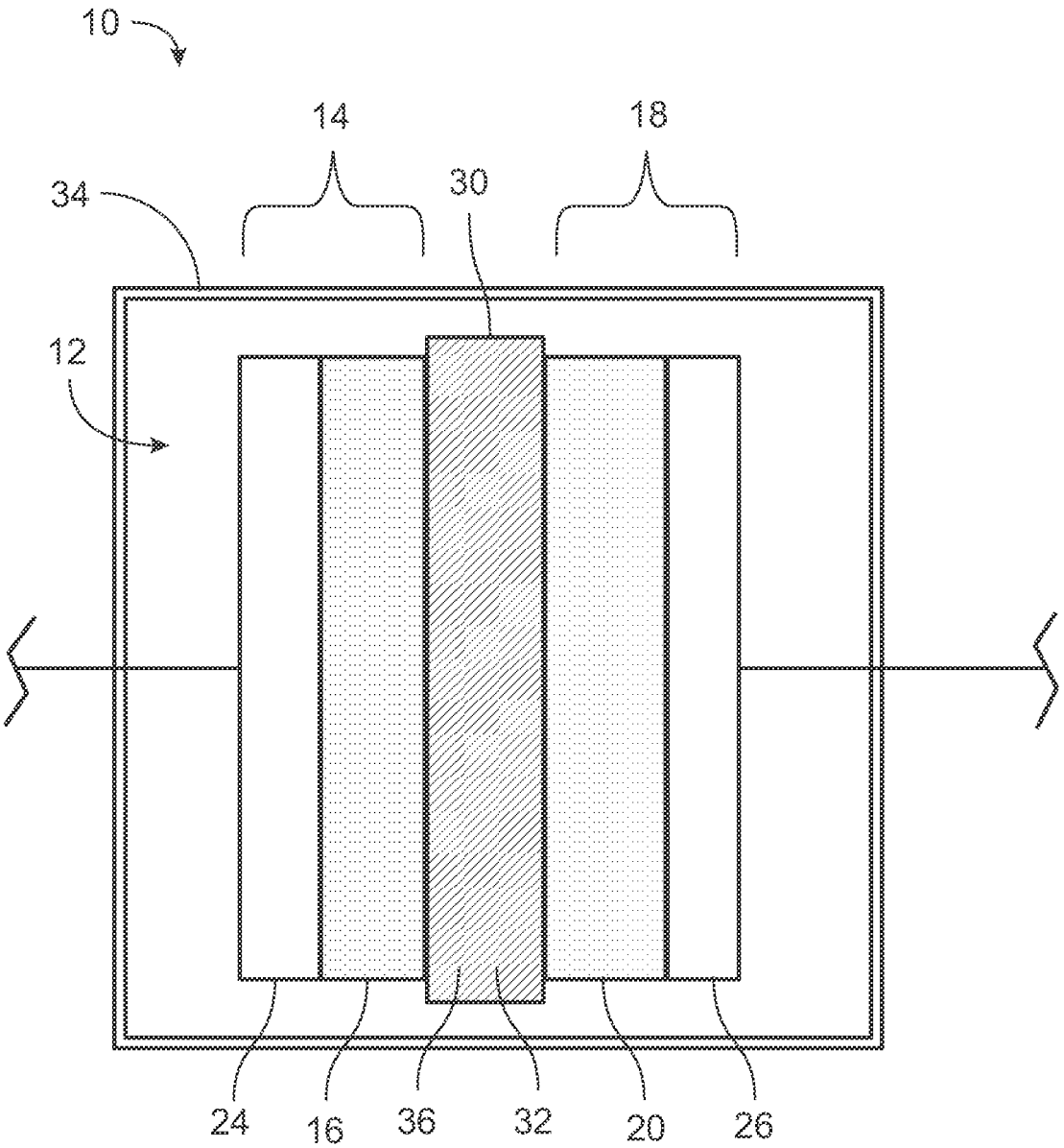
FIG. 1 is a schematic illustration of an exemplary solid-state battery according to the present disclosure.

The present disclosure provides batteries that exhibit high energy densities prolonged cycle life, and reduced risks of fire and explosions. In some examples, the disclosed batteries are substantially rechargeable. In some examples, the disclosed batteries are operable at room temperatures.

"Cathode active materials" refer to the portion of the cathode responsible for supplying ions through an electrolyte and electrons through an external circuit while the battery is charging and for accepting ions through the electrolyte and electrons through the external circuit while the battery is discharging. "Anode active materials" refer to the portion of the anode responsible for supplying ions through an electrolyte and electrons through an external circuit while the battery is discharging and for accepting ions through the electrolyte and electrons through the external circuit while the battery is charging. Both the cathode active material and the anode active material participate in an electrochemical redox reaction by transporting ions through an electrolyte and/or electrons through an external circuit.

When present, any coatings, natural or artificial layers, protective layers of any kind on the surface of the cathode active material or the anode active material that do not participate in the electrochemical redox reaction during charge and discharge of the battery are not considered as part of the respective active materials.

A "solid-state battery" refers to a type of battery having an electrolyte that includes an electrolyte material, where at least a portion of the electrolyte material is solid. A "all-solid-state battery" refers to a solid-state battery having an electrolyte that includes an electrolyte material, where all the electrolyte material is solid. The solid portion of the electrolyte material of the solid-state battery of the present disclosure may be greater than 50 wt. % of the electrolyte material, preferably greater than 75 wt. % of the electrolyte material, and more preferably 100 wt. % of the electrolyte material.

"Inverse vulcanization" refers to a solvent-free polymerization process that produces polymers containing chains of sulfur atoms. The polymers produced by inverse vulcanization consist of long sulfur linear chains interspersed with organic linkers. The use of the inverse vulcanization polymerization method of sulfur permits the fabrication of solid-state electrolyte materials having physical properties that allow the solid-state electrolyte material to form a thin freestanding film.

A "redox reaction" refers to a type of chemical reaction in which the oxidation state of participating atoms, molecules, radicals, or ions are changed by gaining or losing electrons. Redox reactions are characterized by the actual or formal transfer of electrons between chemical species, most often with one species undergoing oxidation while another species undergoes reduction.

A "current collector" refers to the component adjacent to an electrode (cathode or anode) configured to convey current from a fixed to a moving portion of the circuit of the electrochemical cell, or vice versa. A current collector is a bridging component that collects electrical current generated at an electrode and provides a connection to the external circuit. The current collector is typically adjacent to the cathode or the anode. A bipolar current collector can be adjacent to both the cathode and the anode, or both the cathode and the anode can be coated on either side or both sides of the bipolar current collector. In some embodiments, the current collector includes an electrically-conductive material, that is a porous carbon material. The porous carbon material may be selected from, for example, carbon black, carbon nanotubes, carbon nanofibers, carbon dots, activated carbon, graphite, graphene, graphene oxide, reduced graphene oxide, and graphene nanoribbons.

An "electrolyte" or "electrolytic solution" refers to a material that provides for ion transport within an electrochemical cell. An electrolyte acts as a conduit for ion transport through its interaction with an electrode. In particular, during charging of the electrochemical cell, the electrolyte can facilitate the movement of ions from the cathode to the anode, and upon discharge, facilitate the movement of ions from the anode to the cathode.

As used herein, "room temperature" is any temperature within a range of air temperatures that most people prefer for indoor settings, and which feel comfortable when wearing typical indoor clothing. More specifically, room temperature includes temperatures from 15 to 30° C. (or 59 to 86° F.).

As used herein, "solubility" is the maximum amount of a material in weight that will dissolve in a given amount of solvent in weight at a given temperature. "At least slightly soluble" herein means that an amount of the electrolytic solvent in weight required per an amount of the cathode active material in weight is less than 1,000 at a given temperature. "Practically insoluble" herein means that an amount of the electrolytic solvent in weight required per an amount of the cathode active material in weight is greater than 10,000 at a given temperature.

As used herein, "semi-solid" refers to a material whose state lies between a solid and a liquid. While similar to solids in some respects, such as having the ability to support their own weight and hold their shapes, a semi-solid also shares some properties of liquids, such as for example conforming in shape under applied pressure, and flowing under pressure. The terms "quasi-solid," "semisolid," and "semiliquid" may be used interchangeably to refer to semi-solid materials. Typically, the viscosity of a semi-solid lies in a range from 10 mPas to 100,000 mPas.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" may be used to distinguish or identify various members of a group, or the like, and are not intended to show serial or numerical limitation.

Unless they relate to specific examples, all specifications regarding quantities and portions, particularly those for delimiting the subject matter of the present disclosure, indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term: "combination" or "combinations" means, unless otherwise stated, all types of combinations, starting from two of the relevant constituents, to a plurality or all of such constituents.

As shown in FIG. 1, a solid-state battery 10 of the present disclosure includes at least one solid-state electrochemical cell 12, including a cathode 14 with a cathode active material 16, and an electrolyte 30. Each solid-state electrochemical cell 12 may further include an anode 18 that includes an anode active material 20.

Electrolyte 30 and cathode active material 16 of electrochemical cell 12 are selected so that at least a portion of an electrolyte material 36 of electrolyte 30 is solid, and the solid portion of the electrolyte includes a first chlorine compound, and cathode active material 16 includes a second chlorine compound. The first chlorine compound and the second chlorine compound can be identical. When the first chlorine compound and the second chlorine compound are identical, the chlorine compound can work as both a cathode active material and an electrolyte material. In some embodiments, the solid-state battery can be configured so that the first chlorine compound is electrochemically converted into the second chlorine compound, and the second chlorine compound is electrochemically converted into the first chlorine compound.

Solid-state electrochemical cell 12 can further include a separator 32 that separates the cathode from the anode or from the anode current collector. In some embodiments, the electrolyte itself may also work as such a separator. Electrolyte 30 and/or separator 32 can be configured to be larger in their width and/or length than one or both of cathode current collector 24 and anode current collector 26, in order to avoid contact between anode 18 and cathode 14.

In some cases, the disclosed solid-state electrochemical cell 12 includes an anode current collector 26, but does not initially include an anode active material 20. Anode active material 20 can then be deposited onto, or be intercalated with, anode current collector 26 during an initial charging of the solid-state battery 10 including electrochemical cell 12. In such cases, electrolyte 30 can be positioned in cathode 14 and/or between anode current collector 26 and cathode 14. In some embodiments, anode current collector 26 and/or cathode current collector 24 correspond to a cell housing 34 of self-charging electrochemical cell 10.

In some embodiments, the first chlorine compound of the solid-state battery has a melting point of less than 700° C. Preferably, the first chlorine compound has a melting point of less than 600° C. More preferably, the first chlorine compound has a melting point of less than 500° C. Solid-state electrolytes that exhibit lower melting points may be advantageous for the manufacture of the solid-state batteries of the present disclosure. For example, an electrolyte material having a relatively low melting point can be stored in a separate container, under a controlled atmosphere, and introduced to the electrochemical cells being manufactured as needed, with less energy expenditure and lower manufacturing costs.

In some embodiments, the first chlorine compound has a mass percentage of chlorine that is greater than or equal to 3. Preferably, the first chlorine compound may have a mass percentage of chlorine greater than or equal to 6. More preferably, the first chlorine compound may have a mass percentage of chlorine greater than or equal to 9.

In some embodiments, the cathode active material of the solid-state battery includes one or more metals selected from lithium, sodium, potassium, beryllium, magnesium, calcium, vanadium, iron, nickel, copper, zinc, or aluminum. Preferably, the cathode active materials may include one or more metals selected from lithium, sodium, potassium, magnesium, calcium, vanadium, copper, zinc, or aluminum. More preferably, the cathode active materials may include one or more metals selected from lithium, sodium, potassium, magnesium, zinc, or aluminum. In some embodiments, the solid-state battery is configured so that charging the solid-state battery oxidizes a metal of the cathode active material to a metal ion, so that the metal ion can then be transported via the electrolyte.

In some embodiments, a solid portion of electrolyte material 36 of solid-state battery 10 includes sulfur. When a solid portion of electrolyte material 36 includes sulfur, the solid portion can be fabricated via inverse vulcanization of sulfur.

In one aspect of the present disclosure, the disclosed solid-state batteries include an electrolyte 30 including an electrolyte material 36, where at least a portion of the electrolyte material is solid, the solid portion of the electrolyte material is made via inverse vulcanization of sulfur, and a cathode 14 that is in contact with electrolyte 30, where the cathode includes a cathode active material 16.

Preparing Cathode Active Material

Figure 2:
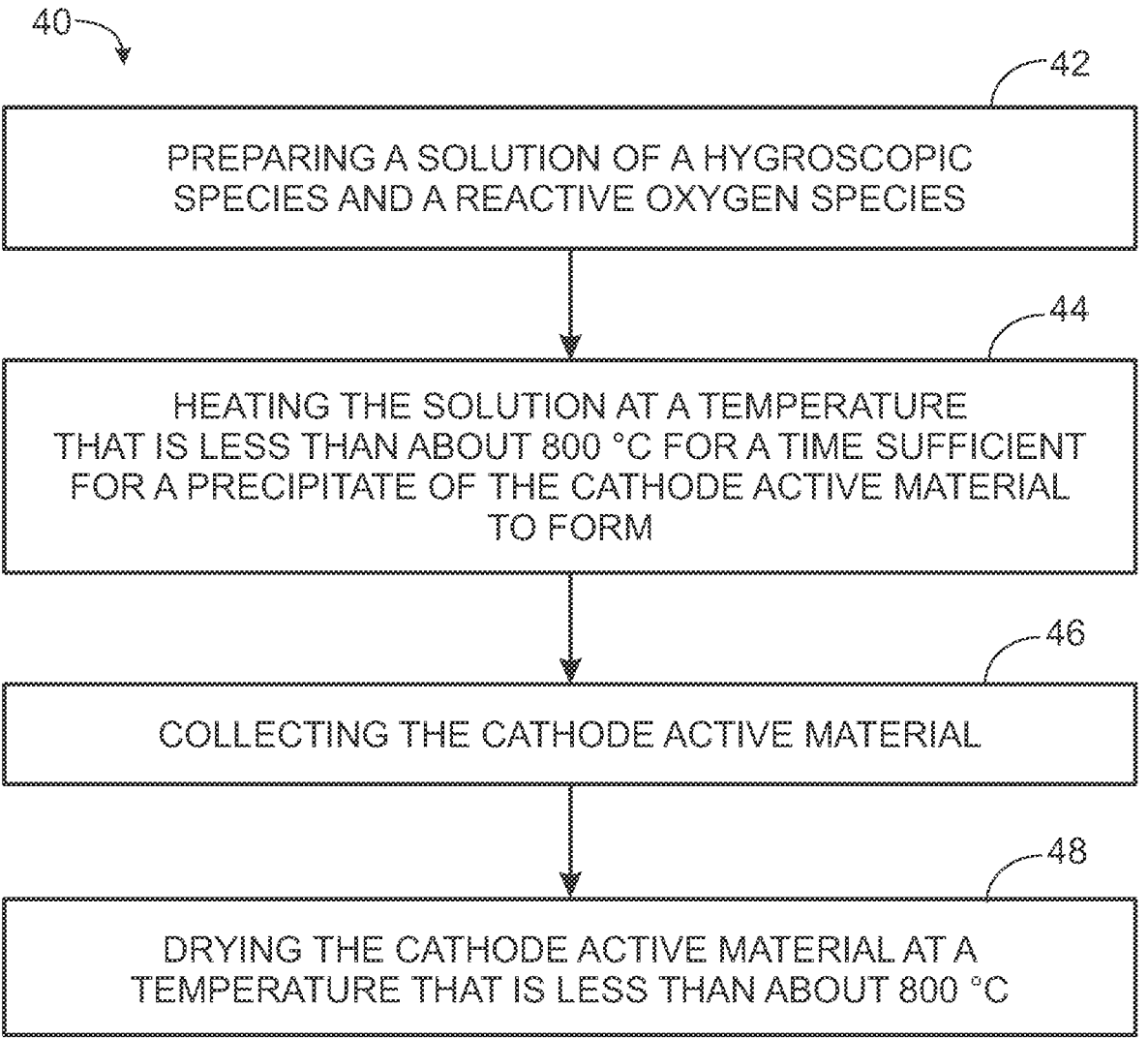
FIG. 2 is a flowchart of an illustrative method of manufacturing a cathode active material according to the present disclosure.

An illustrative method of manufacturing a high-energy cathode active material according to the present disclosure is depicted in flowchart 40 of FIG. 2. The method includes preparing a solution of a hygroscopic species and a reactive oxygen species, at step 42 of flowchart 40; heating the solution at a temperature that is less than about 800° C. for a time sufficient for a precipitate of the cathode active material to form, at step 44 of flowchart 40; collecting the precipitated cathode active material, at step 46 of flowchart 40; and drying the collected cathode active material at a temperature that is less than about 800° C., at step 48 of flowchart 40. The precipitate can be a reactive oxygen species derivative, a reactive oxygen species derivative combined with the hygroscopic species, or a reactive oxygen species combined with the hygroscopic species.

The hygroscopic species used to prepare the cathode active material can be any hygroscopic species that forms a precipitate when heated with an appropriate reactive oxygen species in a solution. Typically, the hygroscopic species is a compound or substance that attracts water from its environment, either by chemical reaction, by incorporating water of hydration, or by physical adsorption. In particular, the hygroscopic species may be substantially free of transition metals. Particularly useful hygroscopic materials can include one or more ionic materials and/or one or more organic materials.

Where the hygroscopic species includes one or more ionic materials, the ionic materials may include one or more ionic compounds, where the ionic compounds are typically salts, and more typically chloride, bromide, pentoxide, sulfide, and/or sulfate salts. The ionic material can also be an acid capable of donating a proton.

Where the hygroscopic species includes one or more organic materials, the organic materials may be selected from any suitable organic compound, or fragment of an organic compound, that incorporates one or more nitrogen or oxygen atoms. For example, the one or more organic materials or organic compounds can be selected from among truxenone, truxenone derivatives, phenoxazine, phenoxazine derivatives, phenothiazine, phenothiazine derivatives, quinone, quinone derivatives, benzoquinone, benzoquinone derivatives, diamine derivatives, phenazine, phenazine derivatives, quinoxaline, quinoxaline derivatives, pyrazine, pyrazine derivatives, triazine, triazine derivatives, dimethoxybenzene, dimethoxybenzene derivatives, cyclopropenium derivatives, and amide derivatives.

Selected examples of hygroscopic species for the present disclosure may include $C_6H_{14}Cl_4N_4$ (benzenetetramine tetrahydrochloride), $C_6H_{16}O_{14}$ (hexaketocyclohexane octahydrate), $C_8H_6O_4$ (terephthalic acid), LiOH (lithium hydroxide), NaOH (sodium hydroxide), $C_{13}H_{22}NO_3$ (tetramethylpiperidine-1-oxyl-4-yl methacrylate), LiCl (lithium chloride), NaCl (sodium chloride), HCl (hydrogen chloride), HBr (hydrogen bromide), LiBr (lithium bromide), $NaClO_3$ (sodium chlorate), $P_2O_5$ (phosphorus pentoxide), $H_2S$ (hydrogen sulfide), $H_2SO_4$ (hydrogen sulfate), $HClO_3$ (chloric acid), $C_7H_6O_2$ (benzoic acid), $C_2HF_3O_2$ (trifluoroacetic acid), HBO (metaboric acid), $C_7H_6O_3$ (salicylic acid), $C_2H_4O_2$ (acetic acid), $C_{16}H_{32}O_2$ (palmitic acid), HSCN (thiocyanic acid), $C_3H_6O_3$ (lactic acid), $H_3PO_4$ (phosphoric acid), $CH_2O_2$ (formic acid), $C_{12}H_{23}N$ (dicyclohexylamine), $C_2H_6N$ (dimethylamine), $C_6H_5SH$ (thiophenol), $C_6H_2O_6$ (rhodizonic acid), $C_{16}H_8O_6$ (anthraquinone-2,3-dicarboxylic acid), $C_6H_2Cl_2O_4$ (chloranilic acid), and $C_{22}H_{24}N_4O_4$ (naphthalenediimide), among others.

The reactive oxygen species can be any species that includes one or more reactive oxygen moieties. For example, the reactive oxygen species can include one or more reactive oxygen moieties such as peroxides, superoxides, superoxide radicals, hydroxyl radicals, peroxyl radicals, perhydroxyl radical, hydroperoxyl radicals, alkoxyl radicals, singlet oxygen, hypochlorous acid, and alphaoxygen. In one embodiment of the present disclosure, the reactive oxygen species includes at least one peroxide moiety. The reactive oxygen species may be selected from one or more of $Li_2O_2$ (lithium peroxide), $H_2O_2$ (hydrogen peroxide), HOCl (hypochlorous acid), $O_2^{*-}$ (superoxide radical), $NaO_2$ (sodium superoxide), NO* (nitroxyl radical), $C_6H_5O^*$ (phenoxyl radical), and $^1O_2$ (singlet oxygen), among others.

Upon reaction, the reactive oxygen species is typically converted to a reactive oxygen species derivative. The reactive oxygen species derivative can be any species that is derived from the reactive oxygen species, and can be distinguished from the reactive oxygen species in that the reactive oxygen species derivative no longer includes a reactive oxygen moiety such as a peroxide, superoxide, superoxide radical, hydroxyl radical, peroxyl radical, perhydroxyl radical, hydroperoxyl radical, alkoxyl radical, singlet oxygen, hypochlorous acid, and alpha-oxygen.

Any method of preparing the solution of the hygroscopic species and reactive oxygen species is a suitable method for the purposes of the method of flowchart 40. For example, preparing a solution of the one or more hygroscopic species and the one or more reactive oxygen species can include the addition of each of the desired hygroscopic species and reactive oxygen species to a single solution to form the desired combined solution. Alternatively, one or both of the hygroscopic species and reactive oxygen species can be initially dissolved in a solvent, and the hygroscopic species solution and the reactive oxygen species solution can then be combined to form the combined solution, or both can be added to an existing solution to form the combined solution.

The resulting solution is then heated at a temperature that is less than about 800° C., but high enough to result in formation of a precipitate of the desired cathode active material. The heating temperature is preferably less than about 600° C., and more preferably less than about 400° C. It should be appreciated that it is normally not possible to heat a solution to temperatures higher than the boiling point of the solution under standard conditions, and so the combined solution should be transferred to a sealed vessel, or autoclave, for heating under elevated pressure. The atmosphere of the sealed vessel, or autoclave can be replaced with high purity oxygen gas during the heat treatment.

When the combined solution has been heated for a time sufficient for a precipitate of the cathode active material to formed, the cathode active material can be collected. Any appropriate separation method can be used to collect the cathode active material precipitate, but typically the precipitate mixture is filtered, and washed. Included in the step of collecting the cathode active material, the filtered and washed cathode active material can be dried under vacuum or under an inert gas atmosphere, typically at a temperature less than about 800° C. The drying temperature is preferably less than about 600° C., and more preferably less than about 400° C.

Testing or further handling of the collected and dried cathode active material should be done under dry conditions, for example in a sealed container or a glovebox with dew point less than −60° C. Such handling can be performed in a dry room.

Cathode Active Material

During preparation of the cathode active material, the hygroscopic species and the reactive oxygen species typically undergo a reaction to produce a cathode active material that includes one or more new materials. In one embodiment, the cathode active material includes at least a first cathode active material and a second cathode active material, where the first and second cathode active materials are distinct materials.

Where the cathode active material includes a first cathode active material and a second cathode active material, the first cathode active material and the second cathode active material may be in contact with each other on and/or in the cathode. The first cathode active material and the second cathode active material may have different solubilities in the electrolytic solvent present in the electrolyte of the battery. In some embodiments, where one of the first cathode active material and second cathode active material may be at least slightly soluble in the electrolytic solvent, the other cathode active material may be practically insoluble in the electrolytic solvent.

In one embodiment, a ratio of the solubility of the first cathode active material in the electrolytic solvent to the solubility of the second cathode active material in the electrolytic solvent is less than 0.5, at a given temperature. In another embodiment, the ratio of the solubility of the first cathode active material in the electrolytic solvent to the solubility of the second cathode active material in the electrolytic solvent is less than 0.2. In another embodiment, ratio of the solubility of the first cathode active material in the electrolytic solvent to the solubility of the second cathode active material in the electrolytic solvent is less than 0.1. In another embodiment, the ratio of the solubility of the first cathode active material in the electrolytic solvent to the solubility of the second cathode active material in the electrolytic solvent is less than 0.01.

In one aspect of the present disclosure, the combination of the hygroscopic species and the reactive oxygen species produces a cathode active material that includes a metal compound and a metal oxide. The metal compound and metal oxide may be separate components of the cathode active material, such as where the cathode active material includes a heterogenous mixture. Alternatively, or in addition, the metal compound and the metal oxide may be associated with one another in a complex, a cluster, or in a crystalline, quasi-crystalline, or amorphous matrix. In one embodiment, one or more of the hygroscopic species is the metal compound. Typically, the cathode active material includes the metal compound and the metal oxide in such a way that the metal compound and the metal oxide are in contact.

The metal compound of the cathode active material may be described by the empirical formula $M_aR_b$, where M is a metal, and each R moiety is independently selected from any appropriate atom, molecule, or radical such that $M_aR_b$ is an inorganic or organometallic compound or complex. Each R moiety may independently have a formal oxidation state of −1, −2, or −3. Typically, each R moiety has a formal oxidation state of −1. The values of a and b are independently positive nonzero real numbers, where $0<a<7$, $0<b<7$. Each R may be a fragment or substituent of a larger compound.

In one embodiment, one or more R moieties may independently be or include one or more of hydrogen, nitrogen, chlorine, bromine, fluorine, sulfur, phosphorous, and boron. Alternatively, or in addition, each R may independently be an inorganic moiety, or an organic moiety.

Alternatively, or in addition, the metal compound of the cathode active material may be described by the empirical formula $MR_x$, where M is a metal, and R is a moiety that is an atom, a molecule, or a radical. R may have a formal oxidation state of −1, −2, or −3. Typically, R has an oxidation state of −1. The value of x is a positive and nonzero real number, where $0<x<7$. Each R moiety may be an organic moiety, or a halogen. Typically, when R is an organic moiety, R is an organic moiety that includes one or more heteroatoms independently selected from nitrogen, chlorine, bromine, fluorine, sulfur, phosphorous, and boron.

Each R moiety that is an inorganic moiety may be selected from hydride, halide, oxide, hydroxide, chlorate, sulfide, sulfate, metaborate, thiocyanate, amide, nitride, and azide, among others.

Each R moiety that is an organic moiety can include one or more of carbon and hydrogen and may be a fragment or substituent of a larger material. In some embodiments, the organic moiety is derived from an appropriate organic material or organic compound. In some embodiments, the organic moieties may be or include, by way of non-limiting examples, alkyl groups, alkenyl groups, alkynyl groups, acyl groups, alkylamino groups, aryl groups, aromatic groups or any combinations thereof. In some embodiments, the organic moiety may include a heteroatom, such as boron, oxygen, nitrogen, sulfur, phosphorous, fluorine, chlorine, bromine, among others, or any combination thereof. In some embodiments, the organic moiety may include one or more aromatic groups. As used herein, the term "aromatic group" is intended to mean a functional group that contain one or more aromatic rings. In some embodiments, the R moiety may comprise carbon, hydrogen, or oxygen. In some embodiments, the R moiety is an organic moiety having 1-6 carbons.

In some embodiments, each R that is an organic moiety excludes alkali metals, alkaline-earth metals, or transition metals.

In some embodiments, where the cathode active material includes a first and a second cathode active materials, at least one of the first and the second cathode active materials includes an organic moiety. In some embodiments, the cathode active material includes an organic compound and/ or an organic moiety.

Non-exclusive examples of suitable R moieties for the present disclosure can include —H (hydride), —OH (hydroxyl), —COOH (carboxyl), —CH (alkyne), —CH$_2$ (alkene), —CHO (aldehyde), —CO— (carbonyl), —COO— (ester), —O— (ether), —NH$_2$ (amine), —CN (nitrile), alkylhalide, oxyhalide, alkane, alkene, alkyne, arene, phenyl, thiol, thial, sulfide, sulfoxide, sulfone, ketone, amide, haloalkane, methoxide, ethoxide, epoxide, phenoxide, nitride, nitrate, nitroso, quinone, imine, imide, azide, lactate, phosphate, formate, and cyanate, among others.

Selected examples of the metal compound of the cathode active material can include MOH, MCl, MBr, MClO$_3$, M$_2$S, M$_2$SO$_4$, MC$_7$H$_5$O, MC$_2$F$_3$O$_2$, MCH$_3$O, MBO$_2$, MC$_7$H$_5$O$_3$, MC$_2$H$_3$O$_2$, MC$_{16}$H$_{31}$O$_2$, MSCN, MC$_9$H$_{18}$N, MC$_3$H$_5$O, M$_3$PO$_4$, MCHO$_2$, MBH$_4$, MC$_{12}$H$_{22}$N, MNH$_2$, MH, MC$_2$H$_5$S, MCH$_3$O, MC$_2$H$_6$N, MC$_6$H$_5$O, MC$_6$H$_5$S, M$_3$N, MN$_3$, MC$_3$H$_7$O, M$_2$C$_8$H$_4$O$_4$, M$_2$C$_6$O$_6$, MC$_{16}$H$_8$O$_6$, M$_2$C$_6$H$_4$O$_4$, MC$_3$H$_2$O$_2$, M$_2$C$_6$Cl$_4$O$_2$, MC$_6$Cl$_4$O$_2$, MC$_3$Cl$_2$O, MC$_6$H$_4$O$_2$, M$_2$C$_6$H$_4$O$_2$, MC$_3$H$_2$O, and MC$_{22}$H$_{24}$N$_4$O$_4$, among others, wherein M is a metal.

The metal oxide of the cathode active material may be described by the empirical formula M'$_x$O$_y$, where M' is a metal that may be the same or different than M of the metal compound, and where x and y are each positive nonzero real numbers, and where $0<x<7$ and $0<y<7$, which may be the same or different. The metal oxide may be, or include, a metal superoxide, a metal superoxide radical, and/or a metal peroxide.

The cathode active material can include the second chlorine compound. In some embodiments, the second chlorine compound includes a metal complex of chlorine. When the second chlorine compound includes a metal complex of chlorine, the metal complex of chlorine can be a metal chloride. The metal chloride can be described by the empirical formula of M"$_c$Cl$_d$, where M" is a metal, and c and d are non-zero positive real numbers. In some embodiments, the second chlorine compound has a mass percentage of chlorine that is greater than or equal to 5. Preferably, the second chlorine compound may have a mass percentage of chlorine greater than or equal to 10. More preferably, the second chlorine compound may have a mass percentage of chlorine greater than or equal to 15.

When the cathode active material includes the second chlorine compound, non-exclusive examples of the second chlorine compound can include M"Cl, M"$_3$ClO, M"$_3$ClO$_2$, M"Mn$_{1.5}$Ni$_{0.5}$O$_{4-x}$Cl$_x$ (0<x<4), M"$_2$FeSiO$_{4-x}$Cl$_x$ (0<x<4), M"$_2$FeMn$_3$O$_{8-0.5x}$Cl$_x$ (0<x<16), M"Ni$_{0.7}$Co$_{0.3}$O$_{2-x}$Cl$_x$ (0<x<2), M"Ni$_{0.33}$Co$_{0.33}$Mn$_{0.33}$O$_{2-x}$Cl$_x$ (0<x<2), M"$_{1+x}$ Ni$_{0.33}$Co$_{0.33}$Mn$_{0.33}$O$_{2-x}$Cl$_x$ (0<x<2), M"$_3$V$_2$(PO$_4$)$_{3-x}$Cl$_x$ (0<x<3), M"$_{1.11}$Ni$_{0.89}$O$_{2-x}$Cl$_x$ (0<x<2), M"$_{1.2}$Mn$_{0.585}$Ni$_{0.185}$Fe$_{0.03}$O$_{2-x}$Cl$_x$ (0<x<2), and M"Fe (PO$_4$)$_{1-x}$Cl$_{3x}$ (0<x<1). Each of M, M', and M", may be the same or different. In one embodiment, one or more of M, M', and M" is selected from lithium, sodium, potassium, beryllium, magnesium, calcium, vanadium, iron, nickel, copper, zinc, or aluminum.

The resulting cathode active material may include at least a portion of the metal compound and at least portion of the metal oxide that, considered in combination, form a cluster. In one aspect of the disclosure, the resulting cluster may be described by the empirical formula M$_a$M'$_b$R$_c$O$_d$, where each of a, b, c, and d are positive nonzero real numbers, which may be the same or different, and where $0<a<7$, $0<b<7$, $0<c<7$, and $0<d<7$. In one embodiment, where M and M' are the same, the resulting cluster may be described by the empirical formula M$_a$R$_b$O$_c$, where each of a, b, and c are positive nonzero real numbers, which may be the same or different, and where $0<a<7$, $0<b<7$, and $0<c<7$.

The resulting cathode active material composition may include a ratio of metal compound:metal oxide that may vary from 5:95 to 75:25 by weight. The composition ratio of M$_a$R$_b$:M"$_x$O$_y$ may be about 10:90, 15:85, 20:80, 25:75, 30:70, 35:65, 40:60, 45:55, 50:50, 55:45, 60:40, 65:35, 70:30, or 75:25. Typically, the cathode active material is at least 25 wt. % metal oxide. Preferably, the cathode active material is at least about 50 wt. % metal oxide. More preferably, the cathode active material is at least about 75 wt. % metal oxide.

In one embodiment, the cathode active material includes a first cathode active material and a second cathode active material, and one of the first and second cathode active materials may include the metal compound and the other may include the metal oxide, as described above. In this embodiment, the first cathode active material may be the metal oxide and the second cathode active material may be the metal compound, and the metal compound exhibits a higher solubility in the electrolytic solvent than the metal oxide.

Where the cathode active material includes a first cathode active material and a second cathode active material, at least one of the first and second cathode active materials may include one or more of hydrogen, nitrogen, chlorine, bromine, fluorine, sulfur, phosphorous, and/or boron.

In one embodiment, at least one of the first and second cathode active materials may include one or more of hydrogen, nitrogen, chlorine, sulfur, and/or phosphorous. Preferably, at least one of the first and second cathode active materials may include one or more of chlorine and/or sulfur. More preferably, at least one of the first and second cathode active materials may include chlorine for its compatibility with a solid-state electrolyte.

Where the cathode active material includes a first cathode active material and a second cathode active material, at least one of the first and second cathode active materials may include one or more metals. In one embodiment, each of the first cathode active material and the second cathode active material includes one or more metals independently. In another embodiment, both the first and second cathode active materials include at least one metal. In some embodiments, the metal or the metals can be selected from lithium, sodium, potassium, beryllium, magnesium, calcium, vanadium, iron, nickel, copper, zinc, or aluminum. In some embodiments, the metal or the metals can be selected from lithium, sodium, potassium, magnesium, calcium, vanadium, zinc, or aluminum. In some embodiments, the metal or the metals can be selected from lithium, sodium, magnesium, vanadium, or zinc, as they are more prone to being oxidized and transported in the electrolyte.

Where at least one of the first and second cathode active materials include one or more metals, when a battery including the resulting cathode is charged, the metal of the first and the second cathode active material is oxidized, converted to a metal ion, and transported via the electrolyte.

Where each of the first and second cathode active materials include one or more metals independently, when a battery including the resulting cathode is charged, the metal of the first and the second cathode active material is oxidized, converted to a metal ion, and transported via the electrolyte. Where both the first and second cathode active materials include at least one metal, when a battery including the resulting cathode is charged, the metal of the first and the second cathode active material is oxidized, converted to a metal ion, and transported via the electrolyte.

The average particle size of the cathode active material may vary from about 5 nm to about 50 μm, exhibiting an average pore size of about 0.1 nm to about 1 μm. Typically, the average particle size of the cathode active material is less than about 50 μm. Preferably, the average particle size of the cathode active material is greater than about 50 nm and less than about 40 μm. More preferably, the average particle size of the cathode active material is greater than about 200 nm and less than about 30 μm. Typically, the average pore size of the cathode active material is less than about 1 μm. Preferably, the average pore size of the cathode active material is greater than about 1 nm and less than about 500 nm. More preferably, the average pore size of the cathode active material is greater than about 5 nm and less than about 200 nm.

In some embodiments, the cathode active material is at least partially enclosed by a protective coating layer at an outer surface. The coating layer may vary from about 1 nm to about 1 μm in thickness. Preferably, the thickness of the protective coating layer is about 2 nm to about 500 nm. More preferably, the thickness of the protective coating layer is about 5 nm to about 200 nm. When present, the protective coating layer may include one or more of carbon and/or oxygen where each element may be present as a compound or complex. The elements included in the protective coating layer may be produced from a reactive gas, wherein the reactive gas is in contact with the electrolyte. Where the reactive gas is carbon monoxide and/or carbon dioxide, the elements included in the cathode surface protective coating layer may preferably include one or more of carbon and/or oxygen. In some embodiments, the protective coating layer includes metal oxide, such as $LiNbO_3$, $Li_2CO_3$, and/or metal halide, such as LiCl, LiF. The purpose of the protective coating layer of the cathode active material is to avoid in part direct contact with the solid-state electrolyte material to prevent any potential parasitic reactions and/or interdiffusion of the solid-state electrolyte material into the cathode active material. When present, the protective surface coating layer is optionally electrically insulating. By "electrically insulating" is meant that cathode surface protective coating exhibits an electrical conductivity that is less than or equal to $10^{-3}$ S/cm. Preferably, cathode surface protective coating exhibits an electrical conductivity of less than or equal to $10^{-5}$ S/cm. More preferably, cathode surface protective coating has an electrical conductivity of less than or equal to $10^{-7}$ S/cm.

High-Energy Cathodes

The cathode active materials disclosed herein can be used to prepare high-energy cathodes, as set out in flowchart 50 of FIG. 3. As shown, the method of manufacturing a cathode for use in a battery includes preparing a solution of a hygroscopic species and a reactive oxygen species, at step 51 of flowchart 50; heating the solution at a temperature that is less than about 800° C. for a time sufficient for a precipitate of the cathode active material to form, at step 52 of flowchart 50; collecting the cathode active material, at step 54 of flowchart 50; drying the collected cathode active material at a temperature that is less than about 800° C., at step 56 of flowchart 50; combining the collected cathode active material with one or more of an electrically-conductive material, a polymeric binder, a plasticizer, and a carboxylic acid, at step 58 of flowchart 50; and depositing the combined cathode material on a current collector to create the cathode, at step 60 of flowchart 50.

Steps 51, 52, 54, and 56 of flowchart 50 are directly analogous to corresponding steps 42, 44, 46, and 48 of flowchart 40, as described above.

As set out in step 58 of flowchart 60, the cathode active material can be combined with one or more of an electrically-conductive material, a polymeric binder, a plasticizer, and a carboxylic acid. Typically, the cathode active material is combined with an electrically-conductive material. Additionally, the cathode active material may be further combined with one or more of a polymeric binder, a plasticizer, and a carboxylic acid.

Where the cathode includes an electrically-conductive material, it can be added to one of the hygroscopic species or reactive oxygen species prior to preparation of the cathode active material, or one or more cathode active materials can be combined with an electrically-conductive material after it is formed. In general, the cathode active material is in contact with the electrically-conductive material. Where the cathode includes a first cathode active material and a second cathode active material, at least one of the first and the second cathode active materials is in contact with the electrically-conductive material.

Where the cathode active material includes a metal compound and a metal oxide, each of the metal compound and the metal oxide are in contact with the other, and one or both the metal compound and the metal oxide are in contact with the electrically-conductive material.

Where the cathode includes the cathode active material and the electrically-conductive material, the cathode composition may include a ratio of the cathode active material: electrically-conductive material that may vary from 20:80 to 99:1 by weight. The composition ratio of cathode active material:electrically-conductive material may be about 20:80, 25:75, 30:70, 35:65, 40:60, 45:55, 50:50, 55:45, 60:40, 65:35, 70:30, 75:25, 80:20, 85:15, 90:10, 95:5, 96:4, 97:3, 98:2, 99:1. Typically, the cathode composition is at least 20 wt. % cathode active material. Preferably, the cathode composition may be at least 40 wt. % cathode active material. More preferably, the cathode composition may be at least 60 wt. % cathode active material.

Any electrically-conductive material that facilitates the performance of the resulting cathode is a suitable electrically-conductive material for the purposes of the present disclosure. In some embodiments, the electrically-conductive material includes a porous carbon material that is, or includes, one or more of carbon black, carbon nanotubes, carbon nanofibers, carbon dots, activated carbon, amorphous carbon, microporous carbon, mesoporous carbon, porous carbon, graphite, graphene, graphene oxide, reduced graphene oxide, graphene nanoribbons, nitrogen-doped carbon, nitrogen-doped graphene, and nitrogen-doped graphene oxide. The electrically-conductive material can have any suitable and compatible physical form, such as particles, powders, paper, foam, fibers, sheets, discs, rods, foils, or any combination thereof. In one embodiment, the electrically-conductive material includes a porous carbon material that is selected from carbon black, carbon nanotubes, carbon nanofibers, carbon dots, activated carbon, graphite, graphene, graphene oxide, and/or graphene nanoribbons. Where cathode includes a porous carbon material, carbon nanotubes and/or carbon nanofibers, and carbon nanotube is particularly preferred due to its high aspect ratio and durability.

In one embodiment, the electrically-conductive material includes a porous carbon material having particles with an average particle size or diameter of about 5 nm to about 50 μm, and exhibiting an average pore size of about 0.1 nm to about 1 μm. Typically, the average particle size or diameter of the electrically-conductive material is less than about 50 μm. Preferably, the average particle size of the electrically-conductive material is greater than about 10 nm and less than about 40 μm. More preferably, the average particle size of the electrically-conductive material is greater than about 50 nm and less than about 30 μm. Typically, the average pore size of the electrically-conductive material is less than about 1 μm. Preferably, the average pore size of the electrically-conductive material is greater than about 1 nm and less than about 500 nm. More preferably, the average pore size of the electrically-conductive material is greater than about 5 nm and less than about 200 nm.

In some embodiments, the average particle size or diameter of the cathode active materials and the electrically-conductive materials are inversely correlated. In such embodiments, when the average particle size of the cathode active material is in the range of about 10 μm to about 50 μm, that of the electrically-conductive material can be about 10 nm to about 50 nm, vice versa. Typically, one or more of the cathode active materials and the electrically-conductive materials include particles with an average particle size or diameter of greater than about 50 nm and less than about 50 μm, preferably greater than about 500 nm and less than about 50 μm, more preferably greater than about 1 μm and less than about 30 μm.

In one embodiment, the step of combining the cathode active material with an electrically-conductive material includes combining the cathode active material with a porous carbon material. The porous carbon material is optionally doped with one or more heteroatoms selected from boron, oxygen, nitrogen, sulfur, phosphorous, fluorine, chlorine, and bromine. Cathodes including a porous carbon material doped with nitrogen and/or fluorine are preferred, and nitrogen is particularly preferred as they permit lower charge transfer resistances. When present, the porous carbon material may include one or more of carbon black, carbon nanotubes, carbon nanofibers, carbon dots, activated carbon, graphite, graphene, graphene oxide, and graphene nanoribbons.

In some embodiments, the electrically-conductive material is at least partially enclosed by a protective coating layer at an outer surface. The coating layer may vary from about 1 nm to about 1 μm in thickness. Preferably, the thickness of the protective coating layer is about 2 nm to about 500 nm. More preferably, the thickness of the protective coating layer is about 5 nm to about 200 nm. When present, the protective coating layer may include one or more of carbon and/or oxygen where each element may be present as a compound or complex. The elements included in the protective coating layer may be produced from a reactive gas, wherein the reactive gas is liquified, dissolved, or in contact with the electrolyte. Where the reactive gas is carbon monoxide and/or carbon dioxide, the elements included in the cathode surface protective coating layer may preferably include one or more of carbon and/or oxygen. In some embodiments, the protective coating layer includes metal oxide, such as $LiNbO_3$, $Li_2CO_3$, and/or metal halide, such as LiCl, LiF. The purpose of the protective coating layer of the electrically-conductive material is to avoid in part direct contact with the solid-state electrolyte material to prevent any potential parasitic reactions.

Any suitable electrically-conductive material may be used for the presently disclosed cathodes, which may have the same or different formulation. Cathode active material and/or electrically-conductive material may be shaped into a planar surface, and/or be a particulate solid. Where cathode active material, an electrically-conductive material, and/or electrolyte is particulate, the particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, among others.

Where the cathode includes a polymeric binder, it can be added to one of the hygroscopic species or reactive oxygen species prior to preparation of the cathode active material, or the cathode active material can be combined with a polymeric binder after it is formed.

The polymeric binder can be added in order to help form a solid cathode from the cathode active material. An appropriate polymeric binder for the purposes of this disclosure can include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, among others. In a particular embodiment, the polymeric binder includes one or poly(ethylene oxide) or poly(vinylidene fluoride).

Alternatively, or in addition, the cathode can incorporate a plasticizer, which can be used to make the resulting cathode softer and more flexible. The plasticizer can include one or more of succinonitrile, glutaronitrile, adiponitrile, ethylene carbonate, sulfolane, 3-methyl-2-oxazolidinone, butylene carbonate, phthalate derivatives, trimellitates, adipates, sebacates, and maleates, among others. In a particular embodiment, the plasticizer can include succinonitrile.

Alternatively, or in addition, the cathode can incorporate one or more carboxylic acids. When present, the carboxylic acid can be a monocarboxylic acid or a polycarboxylic acid. When the carboxylic acid is a polycarboxylic acid, it is optionally oxalic acid.

As set out at step 60 of flowchart 50, the combined cathode material, including cathode active material and optionally including one or more of a conductive material, a polymeric binder, a plasticizer, and a carboxylic acid is deposited on a current collector in order to form the desired cathode.

The current collector can include any suitable and compatible conductive material. In some embodiments, the cathode current collector includes one or more metals such as alkaline earth metals, transition metals, rare earth metals, post-transition metals, and alkali metals. In some embodiments, the cathode current collector includes at least one of aluminum, aluminum alloy, nickel, nickel alloy, duplex steel, stainless steel. In one embodiment, the cathode current collector is a metallic current collector that includes a metal or metal alloy that in turn includes one or more of molybdenum, titanium, and zirconium. In another embodiment, the cathode current collector includes a metal or metal alloy that includes molybdenum. Molybdenum is particularly preferred to be included in the cathode current collector due to its high corrosion resistance. In an alternative embodiment, the cathode current collector is an electrically-conductive material that includes porous carbon in electrical contact with the cathode active material.

The cathode current collector can be solid or perforated. When perforated, the pore size of the cathode current collector can vary from about 500 nm to about 1 mm, with a separation distance between pores of about 10 μm to about 100 mm.

The cathode material, with additional conductive materials, polymeric binder, and plasticizers, if present, can be applied to the current collector using any suitable application technique. For example, the combined cathode material can be cast into a film and deposited onto the desired current collector.

The resulting cathode can be incorporated into a battery 10, as shown in FIG. 1. The cathode current collector and the anode current collector may be the same and described as a bipolar current collector. The bipolar current collector of the present disclosure can include an alloy of one or more of molybdenum, titanium, and zirconium. Molybdenum is particularly preferred to be included in the cathode current collector due to its high corrosion resistance. The cathode and anode are typically separated by the electrolytic separator 32. The battery components are typically held within a battery case or housing, which encloses the battery components, and can keep the battery components under a desired gas composition or atmosphere. The cathode and/or the anode may be in contact with electrolyte 30. It should be appreciated that regardless of how battery is depicted herein, the batteries of the present disclosure may assume any conventional or suitable battery configuration, such as by being formed as button cells, pouch cells, prismatic cells, cylindrical cells, flow cells, in alternating plates, or in jelly rolls, among others.

Anode Active Material

Anode 18 can include an anode active material. In some embodiments, the anode includes one or more of lithium, sodium, potassium, magnesium, calcium, vanadium, aluminum, zinc, silicon, graphite, graphene, porous carbon, activated carbon, silicon compound, a metal oxide, and combinations thereof. The anode active material can be present as a coating, a foil, a mesh, or screen, or another discrete anode component. Alternatively, or in addition, the anode active material can be incorporated into the anode as a component element, or component compound. In some embodiments, anode includes a non-metal oxide as an anode active material. In some embodiments, the anode may include graphite. In some embodiments, the anode may include silicon, graphite, graphene, activated carbon, or a metal, or combinations thereof. Where the anode includes a metal, that metal may be an alkali metal or an alkaline earth metal. In some embodiments, the anode includes a metal oxide. In some embodiments, the anode includes a metal oxide such as $Li_4Ti_5O_{12}$, $TiO_2$, $TiNb_2O_7$, $Nb_{16}W_5O_{55}$, $Nb_{18}W_{16}O_{93}$, $Nb_2O_5$, $Li_3VO_4$, $H_2Ti_6O_{13}$, $LiMnBO_3$, $LiV_{0.5}Ti_{0.5}S_2$, $Li_3V_2O_5$, $LixV_2O_5$, $Li_3MoO_4$, $Li_5W_2O_7$, or any combination thereof.

Anode active material can be generated in situ by careful selection of the components of electrochemical cell, such as for example electrolyte and/or additional components thereof, and optionally by the application of anode current collector to electrochemical cell. The selection of anode active material is not particularly restricted provided that the selected material can store and release ions. For example, anode active material can be an alkali metal (such as lithium, sodium, and/or potassium), an alkaline earth metal (such as, magnesium and/or calcium), an amphoteric metal (such as aluminum and/or zinc), a metalloid (such as boron, germanium, arsenic, antimony, tin, tellurium, polonium, and/or silicon), a metal complex, an inorganic carbon (such as graphite, graphene, graphene oxide, reduced graphene oxide, activated carbon, carbon nanotubes, and/or carbon dots), sulfur, a sulfide (such a metal titanium disulfide $MV_{0.5}Ti_{0.5}S_2$, where M is a metal, metal sulfide ($M_2S$), metal polysulfide (e.g., $M_2S_2$, $M_2S_4$, $M_2S_6$, $M_2S_8$)), a sulfur-containing compound or material (such as a sulfate or organosulfur compound (e.g., poly(sulfur-random-(1,3-di-isopropenylbenzene)), sulfurized polyacrylonitrile)), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M"O_2$, $M'_{1-w}(M"_xM"'_y)O_2$, and/or metal titanate), an organic material or compound (e.g., truxenone, truxenone derivatives, phenoxazine, phenoxazine derivatives, phenothiazine, phenothiazine derivatives (e.g., 10-acetylphenothiazine, 10-[2-(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2, 2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl) or any combination thereof.

In some embodiments, an anode active material can include one or more organic materials, as described above. Where an anode active material includes an organic material, the organic material may be selected from any suitable organic compound or fragment of an organic compound, as described above. In one aspect, anode active material includes an organic compound that includes a heteroatom, such as boron, oxygen, nitrogen, sulfur, phosphorous, fluorine, chlorine, and bromine, among others. Alternatively, or in addition, anode active material can include an organic material that includes one or more aromatic groups.

The materials used as part of the cathode excluding the cathode active materials such as electrically-conductive material, polymeric binder, plasticizer, carboxylic acid, can also be part of the anode. Where the anode includes an electrically-conductive material with one or more additional materials, polymeric binders, and plasticizers, the electrically-conductive material can be applied to a current collector using any suitable application technique. For example, the electrically-conductive material can be cast into a film and then deposited onto the desired current collector.

Anode 18 may include an anode material that is an anode active material, where the particles of the anode active material may be at least partially enclosed by a protective coating layer at an outer surface. The protective coating layer may vary from about 1 nm to about 1 μm in thickness. Preferably, the thickness of the protective coating layer is about 2 nm to about 500 nm. More preferably, the thickness of the protective coating layer is about 5 nm to about 200 nm. In one embodiment, anode surface protective coating layer includes one or more of carbon and/or oxygen, where each element may be present as a compound or complex. The elements included in the anode surface protective coating layer may be produced from a reactive gas. Where the reactive gas is carbon monoxide and/or carbon dioxide, the elements included in the anode surface coating layer may preferably include one or more of carbon and/or oxygen. In some embodiments, the protective coating layer includes metal oxide, such as $LiNbO_3$, $Li_2CO_3$, and/or metal halide, such as LiCl, LiF. The purpose of the protective coating layer of the anode active material is to avoid in part direct contact with the solid-state electrolyte material to prevent any potential parasitic reactions and/or interdiffusion of the solid-state electrolyte material into the anode active material. When present, the protective surface coating layer is optionally electrically insulating. By "electrically insulating" is meant that anode surface protective coating exhibits an electrical conductivity that is less than or equal to $10^{-3}$ S/cm. Preferably, anode surface protective coating exhibits an electrical conductivity of less than or equal to $10^{-5}$ S/cm. More preferably, anode surface protective coating layer has an electrical conductivity of less than or equal to $10^{-7}$ S/cm.

Anode current collector 26 can include a metal or metal alloy, such as copper, a copper alloy, nickel, a nickel alloy, duplex steel, stainless steel, silver, a silver alloy, or any combination thereof. In one embodiment, the anode current collector is a metallic current collector that includes a metal or metal alloy that in turn includes one or more of molybdenum, titanium, and zirconium. In another embodiment, the anode current collector includes a metal or metal alloy that includes molybdenum. Molybdenum is particularly preferred to be included in the anode current collector due to its high corrosion resistance. In some embodiments, the anode current collector can be an electrically-conductive material, such as a porous carbon material that is or includes carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen-doped carbon, nitrogen-doped graphene, nitrogen-doped graphene oxide, and combinations thereof. In some embodiments, the electrically-conductive material is in the form of particles, powders, paper, foam, fibers, sheets, discs, rods, foils, or any combination thereof.

Figure 4:
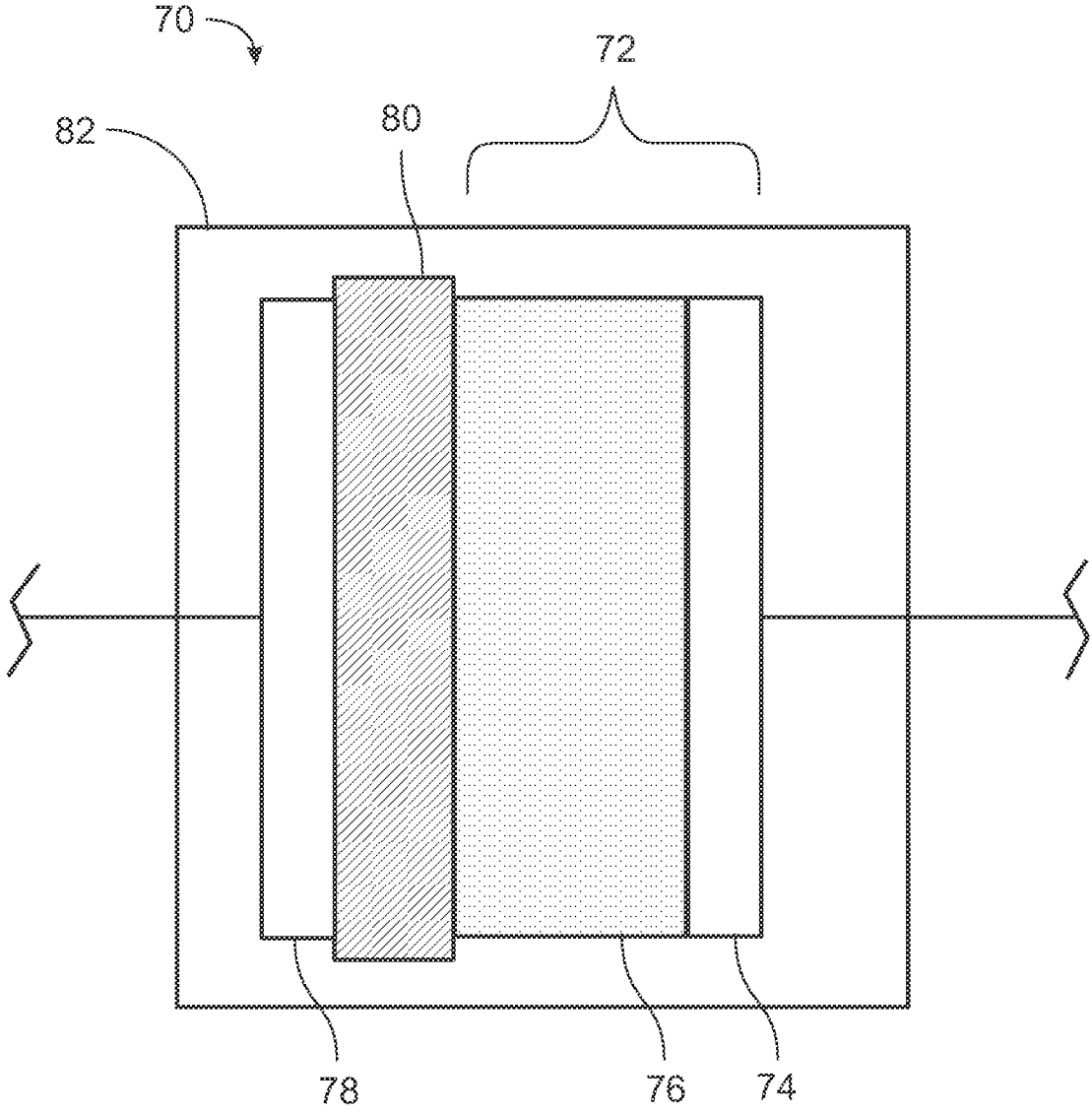
FIG. 4 is a semi-schematic diagram of an illustrative anode-free battery according to the present disclosure.

In some embodiments, the battery of the present disclosure can be a so-called "anode-free" battery. For example, an anode-free battery is shown schematically in FIG. 4. Battery 70 includes a cathode 72 according to the present disclosure, including the combined cathode material 76 as described above, which may include one or more distinct cathode active materials, applied to a cathode current collector 74. Battery 70 includes no anode, but incorporates an anode current collector 78 where the cathode and the anode current collector are separated by an electrolytic separator 80. The anode-free battery is held within a battery case or housing 82, which encloses the battery components, and can keep the battery components under a desired gas composition or atmosphere. During charging, metal ions oxidized from cathode are transported via the electrolyte and deposited on the anode current collector.

Figure 5:
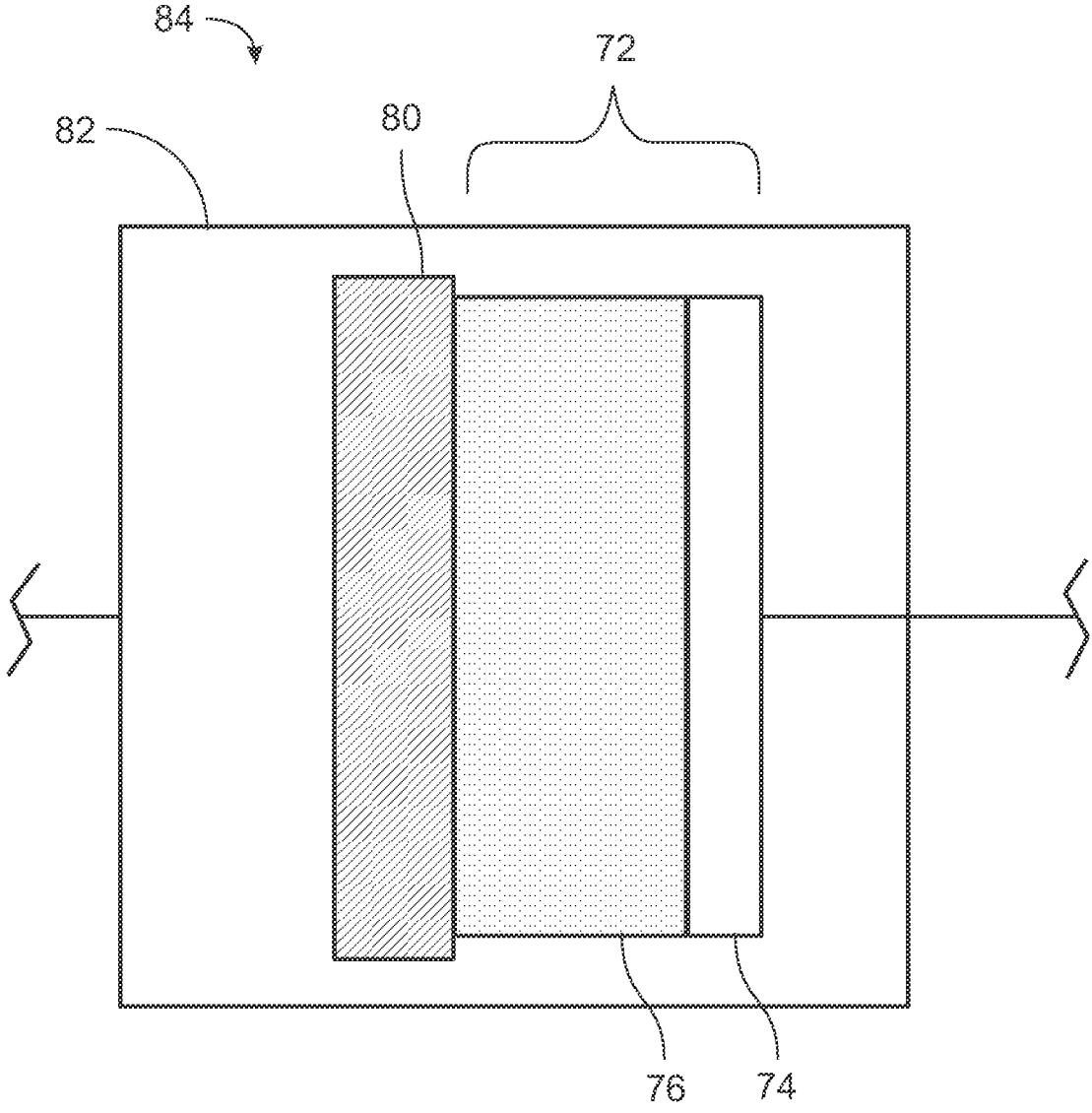
FIG. 5 is a semi-schematic diagram of an alternative illustrative anode-free battery according to the present disclosure.
Figure 6:
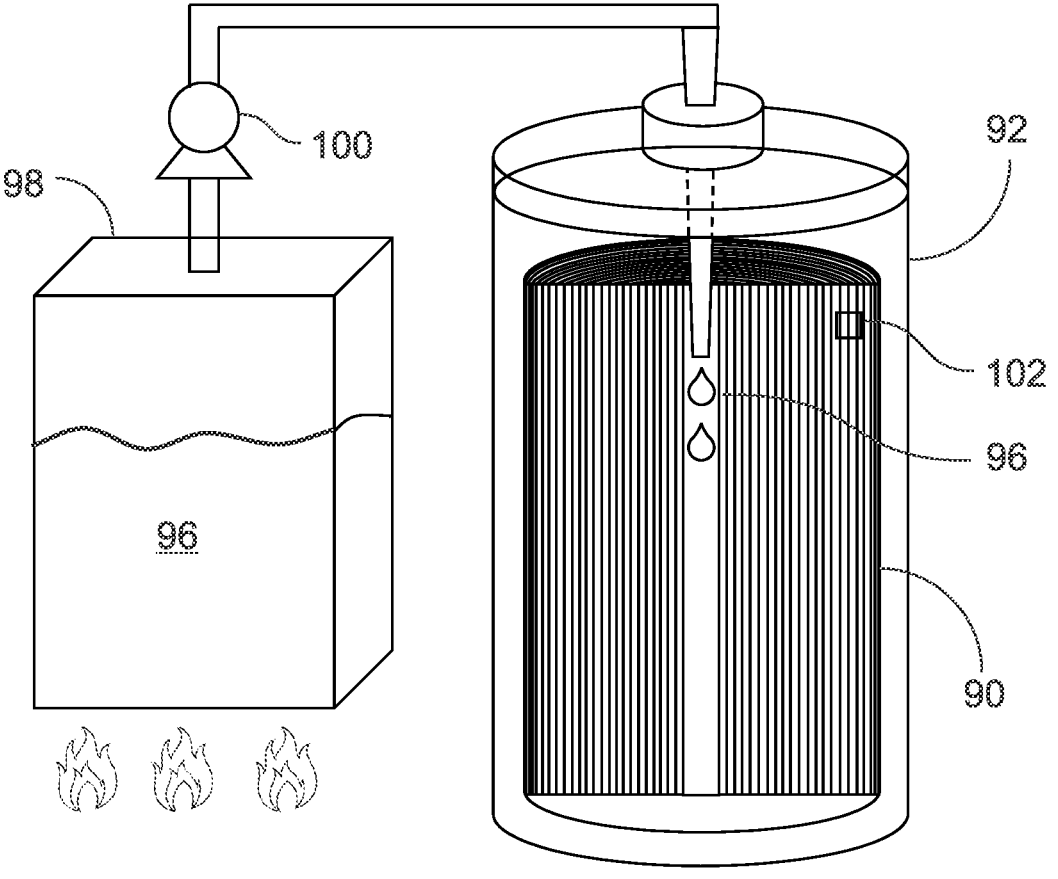
FIG. 6 is a schematic illustration showing the manufacture of a solid-state battery that includes an electrolyte and a cathode manufactured according to the present disclosure.

An alternative embodiment of an anode-free battery is schematically depicted in FIG. 5, where anode-free battery 84 includes a cathode 72 according to the present disclosure, including the combined cathode material 76 as described above, which may include one or more distinct cathode active materials, applied to a cathode current collector 74. Battery 84 includes no anode and no anode current collector. The anode-free battery is held within a battery case or housing 82, which encloses the battery components, and can keep the battery components under a desired gas composition or atmosphere. In this embodiment, during charging, metal ions oxidized from cathode are transported via the electrolyte and deposited on an inner surface of battery housing 82.

Electrolyte

As discussed above, electrolyte 30 can include electrolytic separator 32, which may be in contact with the cathode 14, or separator 30 may be in contact with electrolyte 30. Where electrochemical cell 12 includes an anode, electrolytic separator 32 can be disposed between cathode 14 and anode 18. Separator 32 may be larger in one or both of its width and length than one or both of cathode current collector 24 and anode current collector 26, in order to avoid contact between cathode and anode, between cathode and anode current collector, between cathode current collector and anode, or between cathode current collector and anode current collector.

Electrolytic separator 32 can be disposed between cathode 14 and anode 18, and typically includes an electrolyte to provide for ion transport within battery, and act as a conduit for ion transport through its interaction with the anode material and the cathode material. Electrolytic separator can be in contact with the electrolyte. The separator can include an electrically-insulating material. By "electrically insulating" is meant that the separator exhibits an electrical conductivity that is less than or equal to $10^{-5}$ S/cm. Preferably, the separator exhibits an electrical conductivity of less than or equal to $10^{-7}$ S/cm. More preferably, the separator has an electrical conductivity of less than or equal to $10^{-9}$ S/cm. In some embodiments, the electrically-insulating material of the separator has a melting point greater than 200° C. Preferably, the electrically-insulating material of the separator may have a melting point greater than 300° C. More preferably, the electrically-insulating material of the separator may have a melting point greater than 400° C. In some embodiments, the electrically-insulating material of the separator has a porosity greater than 50%. Preferably, the electrically-insulating material of the separator may have a porosity greater than 70%. More preferably, the electrically-insulating material of the separator may have a porosity greater than 90%. The separator can include a polymer material, such as for example a polymer film such as polyethylene, polypropylene, poly(tetrafluoroethylene), or poly(vinyl chloride), among others. Typically, the polymer film, when present, includes polypropylene and/or polyethylene. Alternatively, or in addition, electrolytic separator can include, nonwoven fibers (such as nylon, polyesters, and glass, among others), a glass, a ceramic, or any combination thereof. In some embodiments, the separator includes glass fibers. In some embodiments, the separator includes a surfactant coating or treatment to enhance the wettability of a liquid-based electrolyte.

Electrolyte 30 is a material that can act as a conduit for ion transport within electrochemical cell of battery through its interaction with the electrodes of the cell. Electrolyte 30 can be a liquid, a solid, a gel, or a liquified gas that includes an electrolyte material that is ionically conductive. Electrolyte 30 may include an electrolytic solvent. Electrolyte 30 may include water as the electrolytic solvent. Electrolyte material 36 can be selected to have an ionic conductivity of greater than or equal to $10^{-10}$ S/cm and an electrical conductivity of less than or equal to $10^{-1}$ S/cm. Preferably, electrolyte material 36 has an ionic conductivity of greater than or equal to $10^{-8}$ S/cm and an electrical conductivity of less than or equal to $10^{-3}$ S/cm. More preferably, electrolyte material has an ionic conductivity of greater than or equal to $10^{-6}$ S/cm and an electrical conductivity of less than or equal to $10^{-5}$ S/cm.

Where the cathode active material of the battery includes a first cathode active material and a second cathode active material, electrolyte can include an electrolytic solvent. In one embodiment, the electrolyte and/or the electrolytic solvent can be a solid or a semi-solid. In another embodiment, such an electrolyte further comprises an additional solid or semi-solid electrolyte. In another embodiment, such a battery includes a separator that includes a polymeric material.

Where electrolyte 30 includes a solid electrolyte material 36, the solid electrolyte material can include one or more polymers, glass, phosphates, fluorophosphates, carbonates, amines, borates, fluoroborates, halides, halates, oxohalides, oxides (e.g., $MO_2$, $M_2O_3$, $M_2B_2O_5$, $M_2O$, $MOH$, $M_2O_2$, $M_2CO_3$, $P_2O_5$, $MPO_4$, $M_2M'_3O_7$, wherein M is a metal or metalloid), perovskites, antiperovskites (e.g., $M_3OBr$, $M_3Ocl$, $M_2OHBr$, $M_2OHCl$, wherein M is a metal or metalloid), LISICON-type electrolytes (e.g., $M_{1+x}M'_xM''_{2-x}(PO_4)_3$, $M_{2+2x}M'_{1-x}M''O_4$, $M_{(3+x)}M'_xV_{(1-x)}O_4$, $M_{(4-x)}M'_{(1-x)}PxO_4$, $M_{1+x+y}M'_xM''_{2-x}Si_yP_{3-y}O_{12}$, $M_{1+x}M'_xM''_yTi_{2-x-y}P_3O_{12}$, $M_{1+x+3y}M'_xM''_{2-x}(Si_yPO_4)_3$, $M_{14}M'M''_4O_{16}$, $M_{4-x}M'_xV_xO_4$, wherein M is a metal or metalloid), garnets (e.g., $M_7M'_3M''_2O_{12}$, $M_{7-x}M'_3M''_{2-x}Nb_xO_{12}$, $M_7M'_{3-x}M''_xZr_{2-x}Nb_xO_{12}$, $M_{6+x}M'_3M''_{1+x}Ta_{1-x}O_{12}$, wherein M is a metal or metalloid), sulfides (e.g., $M_6PS_5Cl$, $M_{9.54}M'_{1.74}P_{1.44}S_{11.7}Cl_{0.3}$, $M_{10}M'P_2S_{12}$, $M_7PS_6$, $M_7P_3S_{11}$, $M_{3.25}P_{0.95}S_4$, $M_{3+x}M'_xP_{1-x}S_4$, $M_2S$, $P_2S_5$, $M_3PS_4$, $MS_2$, $M_7M'PS_8$, $M_6PS_5Br$, $M_6PS_5I$, $M_3PO_4$, $M_3P_7S_{11}$, $M_2M'S_3$, $M_4M'S_4$, $M_{4-2x}M'_xM''S_4$, $MM'S_2$, $M_5M'S_4$, $M_{11-x}M'_{2-x}P_{1+x}S_{12}$, $M_{4-x}M'_{1-x}P_xS_4$, $M_{10}M'P_2S_{12}$, where $0<x<1$, and where M is a metal or metalloid), thio-LISICON type electrolytes (e.g., $M_{(4-x)}M'_{(1-x)}P_xS_4$, wherein M is a metal or metalloid), oxynitrides, nitrides, or the like (LISICON is an acronym for Lithium Super Ionic CONductor). The solid or semi-solid electrolyte material can be an electrolytic solvent or an electrolyte, and can optionally include one or more electrolytic solvents and/or one or more salts dissolved in the electrolytic solvents.

Where electrolyte 30 is present in electrochemical cell as a solid or a semi-solid, electrolyte 30 is optionally present in the form of a film, a foil, a tape, a paper, a sheet, a layer, or the like. The electrolyte of the present disclosure can be selected to include an electrolyte material 36 that is solid, where the solid portion of the electrolyte material includes the first chlorine compound.

Selected and non-limiting examples of appropriate first chlorine compounds for the purposes of the present disclosure include $MCl$, $M_{7-x}PS_{6-x}Cl_x$ $(0<x<6)$, $M_6PS_5Cl$, $M_7M'_xP_{3-x}S_{11-y}Cl_y$ $(0<x<3, 0<y<11)$, $M_{11-x}M'_{2-x}P_{1+x}S_{12-y}Cl_y$ $(0<x<2, 0<y<12)$, $M_{4-x}M'_{1-x}P_xS_{4-y}Cl_y$ $(0<x<1, 0<y<4)$, $M_{6+x}M'_xP_{1-x}S_5Cl$ $(0<x<1)$, $M_{2-x}OHCl_{1-x}$ $(0<x<1)$, $M_{3-x}OH_xCl$ $(0<x<1)$, $M_3ClO$, $M_4Cl(OH)_3$, $M_5Cl_3(OH)_2$, wherein M is a metal or metalloid.

Each M, M', or M" of the present disclosure can be selected from the group consisting of lithium, sodium, potassium, beryllium, magnesium, calcium, vanadium, iron, nickel, copper, manganese, zinc, boron, silicon, tin, gallium, germanium, and aluminum. M, M', or M" of the present disclosure can be an alkali metal as the inclusion of the alkali metal is conducive to high energy density. It can be preferable to use the same metal or metalloid of the electrolyte material in the cathode active material and/or the anode active material, when present.

Where electrolyte 30 is present in electrochemical cell as a solid, electrolyte 30 is optionally present as a composition of solid particles. An average particle size of an appropriate electrolyte material 36 may vary from about 5 nm to about 30 μm, and may exhibit an average pore size of about 0.1 nm to about 500 nm. Typically, the average particle size or diameter of an appropriate electrolyte material is less than about 30 μm. Preferably, the average particle size of the electrolyte material is greater than about 10 nm and less than about 20 μm. More preferably, the average particle size of the electrolyte material is greater than about 20 nm and less than about 10 μm. Where electrolyte 30 is present as a composition of solid particles, an average pore size of the electrolyte material may be less than about 500 nm. Preferably, the average pore size of the electrolyte material is greater than about 0.5 nm and less than about 200 nm. More preferably, the average pore size of the electrolyte material is greater than about 1 nm and less than about 100 nm.

Where electrolyte 30 includes a liquified gas, the liquified gas can include one or more of a methane (e.g., methane, fluoromethane, difluoromethane), an ethane (e.g., ethane, fluoroethane, 1,1-difluoroethane, 1,1,1,2-tetrafluoroethane), a propane (e.g., propane, 2-fluoropropane), a butane (e.g., butane, fluorobutane), an ethylene, an acetylene, a propylene, carbon monoxide, and carbon dioxide. The liquified gas may be produced from a gas at or below the condensation temperature of the gas at the critical pressure or at or above the vapor pressure of the gas at the critical temperature.

Where electrolyte 30 includes an organic liquid, the organic liquid can include one or more organic carbonates, ethers, esters, amides, halogenated liquids, nitriles, or ionic liquids.

Where electrolyte 30 includes an organic carbonate, the organic carbonate can be, for example, propylene carbonate, dimethyl carbonate, diethyl carbonate, ethyl methyl carbonate, ethylene carbonate, vinylene carbonate, fluoroethylene carbonate, dipropyl carbonate, 4-vinyl-1,3-dioxolan-2-one, 4-chloro-1,3-dioxolan-2-one, diethyl 2,5-dioxahexanedioate, bis(2,2,2-trifluoroethyl) carbonate, 4-fluoro-1,3-dioxolan-2-one, dimethyl 2,5-dioxahexanedioate, or dibutyl carbonate, among others.

Where electrolyte 30 includes an ether, the ether can be, for example, dimethoxyethane, dimethoxymethane, dimethyl ether, diethyl ether, ethylene glycol, ethylene glycol derivatives (diglyme, triglyme, tetraglyme), tetrahydrofuran, dioxolane, or dioxane, among others.

Where electrolyte 30 includes an ester, the ester can be, for example, triethyl borate, trimethyl borate, tris(2,2,2- trifluoroethyl) borate, 2,4,6-trimethoxyboroxin, tributyl borate, trihexyl borate, or tripropyl borate, among others.

Where electrolyte 30 includes an amide, the amide can be, for example, dimethylformamide, diethylformamide, dimethylacetamide, diethylacetamide, dimethylpropionamide, diethylpropionamide, 2,2,2-trifluorodimethylacetamide or dipropylacetamide, among others.

Where electrolyte 30 includes a halogenated liquid, the halogenated liquid may include, for example, a chlorinated liquid (such as dichloromethane), or a fluorinated liquid (such as, for example, fluoroethylene carbonate, 1,1,2,2-tetrafluoroethyl 2,2,2-trifluoroethyl ether, difluoromethyl 2,2,3,3-tetrafluoropropyl ether, methyl 2,2,3,3,3-pentafluoropropyl ether, methyl 1,1,2,2-tetrafluoroethyl ether, bis(2,2,2-trifluoroethyl) ether, 1,1,2,3,3,3-hexafluoropropyl methyl ether, or ethyl 1,1,2,2-tetrafluoroethyl ether).

Where electrolyte 30 includes a solvent that is a nitrile, the nitrile may include, for example, acetonitrile, propionitrile, methoxyacetonitrile, 3-methoxypropionitrile, succinonitrile, glutaronitrile, adiponitrile, tetracyanoethylene, 3,3'-oxydipropionitrile, 3-ethoxypropionitrile, 1,3,6-hexanetricarbonitrile, 1,2,2,3-propanetetracarbonitrile, malononitrile, fumaronitrile, valeronitrile, acrylonitrile, tolunitrile, methoxybenzonitrile, or 3-butoxypropionitrile, among others.

Where electrolyte 30 includes an ionic liquid, the ionic liquid can be, for example, an imidazolium derivative (such as, for example, 1-ethyl-3-methylimidazolium hexafluorophosphate, 1-ethyl-3-methylimidazolium tetrafluoroborate, 1-ethyl-2,3-dimethylimidazolium bis(trifluoro-methanesulfonyl)imide, 1-ethyl-3-methylimidazolium bis(trifluoromethanesulfonyl)imide, 2,3-dimethyl-1-propylimidazolium bis(trifluoro-methanesulfonyl)imide, 1-decyl-3-methyl-imidazolium tetrafluoroborate, 1-decyl-3-methylimidazolium bis(trifluoro-methanesulfonyl)imide, 1,3-dimethylimidazolium bis(trifluoromethanesulfonyl)imide, 1-dodecyl-3-methylimidazolium bis(trifluoro-methanesulfonyl)imide, 1-ethyl-3-methyl-imidazolium nitrate, 1-ethyl-3-methyl-imidazolium trifluoromethanesulfonate, 1-vinylimidazole bis(trifluoro-methanesulfonyl)imide, 1-allyl-3-methylimidazolium bis(trifluoromethanesulfonyl)imide, 1-methyl-3-n-octylimidazolium trifluoro-methanesulfonate, 3-ethyl-1-vinylimidazolium bis(trifluoromethanesulfonyl)imide, 1-methyl-3-n-octylimidazolium tetrafluoroborate, 1-butyl-2,3-dimethylimidazolium tetrafluoro-borate, 1-butyl-2,3-dimethylimidazolium hexafluorophosphate, 1-butyl-3-methylimidazolium tetrafluoroborate, 1-butyl-3-methylimidazolium methanesulfonate, 1-butyl-3-methylimidazolium bis(trifluoromethanesulfonyl)imide, 1-butyl-3-methyl-imidazolium hexafluorophosphate, 1-butyl-2,3-dimethylimidazolium trifluoro-methanesulfonate, 1-ethyl-3-methylimidazolium methane-sulfonate, 1-butyl-3-methylimidazolium trifluoromethanesulfonate, 1-butyl-2,3-dimethyl-imidazolium bis(trifluoromethanesulfonyl)imide, 1-methyl-3-(4-sulfobutyl)imidazolium bis(tri-fluoromethanesulfonyl)imide, 1-methylimidazole bis(trifluoromethanesulfonyl)imide, 1-methyl-1H-imidazol-3-ium hexafluorophosphate, or 3,3'-(butane-1,4-diyl)bis(1-vinyl-3-imidazolium) bis(trifluoromethanesulfonyl)imide), among others.

Where electrolyte 30 includes an ionic liquid, the ionic liquid can be, for example, a pyrrolidinium derivative, (such as, for example, 1-butyl-1-methylpyrrolidinium trifluoromethanesulfonate, 1-butyl-1-methylpyrrolidinium hexafluorophosphate, 1-methyl-1-pentylpyrrolidinium bis (trifluoromethanesulfonyl)imide, 1-methyl-1-propylpyrrolidinium, bis(trifluoromethanesulfonyl)imide, 1-butyl-1-methylpyrrolidinium bis(trifluoro-methanesulfonyl) imide, 1-ethyl-1-methylpyrrolidinium tetrafluoroborate, or 1-allyl-1-methylpyrrolidinium bis(trifluoromethanesulfonyl)imide, among others).

Where electrolyte 30 includes an ionic liquid, the ionic liquid can be, for example, a pyridinium derivative (such as, for example, 1-butyl-4-methylpyridinium hexafluorophosphate, 1-butyl-4-methylpyridinium bis(trifluoro-methanesulfonyl)imide, 1-hexylpyridinium hexafluorophosphate, 1-ethyl-3-(hydroxymethyl)pyridinium ethyl sulfate, 1-butylpyridinium tetrafluoroborate, 1-butylpyridinium hexafluorophosphate, 1-butyl-4-methylpyridinium hexafluorophosphate, 1-butylpyridinium tetrafluoroborate, 1-butylpyridinium hexafluorophosphate, 1-butyl-4-methylpyridinium tetrafluoroborate, 1-ethyl-3-methylpyridinium bis(trifluoro-methanesulfonyl)imide, 1-ethyl-3-methylpyridinium ethyl sulfate, 1-methylpyridinium bis(trifluoromethanesulfonyl)imide, or 1,1'-bis[3-(trimethylammonio)propyl]-4,4'-bipyridinium, among others).

Where electrolyte 30 includes an ionic liquid, the ionic liquid can be, for example, a piperidinium derivative such as, for example, 1-butyl-1-methylpiperidinium bis(trifluoromethanesulfonyl)imide, or 1-methyl-1-propylpiperidinium bis(fluorosulfonyl)-imide, among others.

Where electrolyte 30 includes an ionic liquid, the ionic liquid can be, for example, an ammonium derivative such as, for example, methyltri-n-octylammonium bis(trifluoromethane sulfonyl)imide, ethyl(3-methoxypropyl)dimethylammonium bis(trifluoro-methanesulfonyl)imide, ethyl(2-methoxyethyl)dimethylammonium bis(trifluoromethane-sulfonyl)imide, butyltrimethyl ammonium bis(trifluoromethane-sulfonyl)imide, tetrabutyl-ammonium trifluoromethanesulfonate, methyltri-n-octylammonium bis(trifluoro-methane-sulfonyl)imide, trimethyl-propylammonium bis(trifluoromethanesulfonyl)imide, tributyl-methyl-ammonium bis(trifluoromethane sulfonyl)imide, butyltrimethylammonium bis(trifluoro-methanesulfonyl)imide, or tetrabutyl ammonium hexafluorophosphate, among others.

Where electrolyte 30 includes an ionic liquid, the ionic liquid can be, for example, a phosphonium derivative such as, for example tributylmethylphosphonium bis(trifluoromethanesulfonyl)imide, tributyl(2-methoxyethyl)-phosphonium bis(trifluoro-methane-sulfonyl)imide, tetrabutylphosphonium tetrafluoroborate, tetrabutylphosphonium hexafluorophosphate, or tributylmethylphosphonium bis(trifluoromethane-sulfonyl)imide, among others.

Where electrolyte 30 includes an ionic liquid, the ionic liquid can be, for example, a morpholinium derivative, or a sulfonium derivative (such as, for example, triethylsulfonium bis(trifluoromethanesulfonyl)imide)).

Where electrolyte 30 is present in electrochemical cell as a solution that includes a solvent and a solute dissolved in the solvent, the solute may include one or more ionic metal complexes, such as, for example, bis(nonafluorobutanesulfonyl)imide, metal (fluorosulfonyl) (trifluoro-methanesulfonyl)imide, metal trifluoromethanesulfonate, metal tetrafluoroborate, metal hexafluorophosphate, metal bis(fluorosulfonyl)imide, metal nonafluoro-1-butanesulfonate, metal bis(trifluoromethane sulfonyl)imide, metal tricyanomethanide, metal nitrates, metal halides, metal bis(oxalato)borate, metal difluoro(oxalato)borate, or metal perchlorate, among others.

Electrolyte 30 may optionally include one or more additives, where the additives can be polymeric materials, plasticizers, phosphazenes, phosphates, sulfonyls, and carboxylic acids. When present, the polymeric material can include, for example, one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, in any combination. In one embodiment, the polymeric material includes one of poly(ethylene oxide) or poly(vinylidene fluoride), among others.

Where the additive includes a plasticizer, the plasticizer can include, for example, succinonitrile, glutaronitrile, adiponitrile, ethylene carbonate, propylene carbonate, dimethyl sulfoxide, γ-butyrolactone, sulfolane, 3-methyl-2-oxazolidinone, butylene carbonate, phthalate derivatives, trimellitates, adipates, sebacates, maleates, or any combination thereof, among others.

Where the additive includes a phosphazene, the phosphazene can include, for example, one or more of pentafluoro (phenoxy)cyclotriphosphazene, phosphonitrilic chloride trimer, ethoxy(pentafluoro)cyclotriphosphazene, hexaphenoxycyclo-triphosphazene, or hexafluorocyclotriphosphazene, among others.

Where the additive includes a phosphate, the phosphate may include, for example, one or more of tris(1,1,1,3,3,3-hexafluoro-2-propyl) phosphate, tris(2-butoxyethyl) phosphate, tris(2-ethylhexyl) phosphate, tris(1H,1H,5H-octafluoropentyl) phosphate, 2-ethylhexyl diphenyl phosphate, triamyl phosphate, tri-o-cresyl phosphate, triallyl phosphate, tri-m-cresyl phosphate, triethyl phosphate, tri-p-cresyl phosphate, triphenyl phosphate, trimethyl phosphate, tris(2,2,2-trifluoroethyl) phosphate.

Where the additive includes a sulfonyl, the sulfonyl may include, for example, one or more of isopropyl methyl sulfone, dimethyl sulfone, dimethyl sulfite, dipropyl sulfone, 1,3-propanesultone, 3-methylsulfolane, 1,4-butanesultone, tetrahydrothiophene 1,1-dioxide, 1,3,2-dioxathiolane 2,2-dioxide, 1,3,2-dioxathiolane 2-oxide.

Where the additive includes a carboxylic acid, the carboxylic acid may be, for example, a monocarboxylic acid or a polycarboxylic acid. When the carboxylic acid is a polycarboxylic acid, it may be oxalic acid. When present, the carboxylic acid may be present in the electrolyte at a weight percentage of between about 0.01 wt. % and about 30 wt. %, preferably between about 0.1 wt. % and about 20 wt. %, more preferably between about 1 wt. % and about 10 wt. %.

Where electrolyte 30 is or includes a gel, the gel is typically obtained by mixing an appropriate liquid electrolyte material (as described above) with an appropriate solid electrolyte material (as described above). By appropriate is meant that the liquid and solid electrolyte materials are physically and chemically compatible, and that when mixed together in a selected ratio an electrolyte gel can be obtained that exhibits the desired consistency and electrolytic properties.

In some embodiments, the battery can be called "single-material" battery, where the cathode active materials disclosed herein can also be used as the electrolyte and/or the separator. In such embodiments, the cathode active materials that are not in contact with the electrically-conductive materials or the current collector function as the electrolyte and/or the separator.

Where the battery 10 includes the cathode 14 and the electrolyte 30, its composition may include a ratio of the cathode:electrolyte that may vary from 15:85 to 95:5 by weight. The composition ratio of the cathode:electrolyte may be about 15:85, 20:80, 25:75, 30:70, 35:65, 40:60, 45:55, 50:50, 55:45, 60:40, 65:35, 70:30, 75:25, 80:20, 85:15, 90:10, 95:5. Typically, the cathode electrolyte ratio is at least 15 wt % cathode. Preferably, the cathode electrolyte ratio is at least 30 wt % cathode. More preferably, the cathode electrolyte ratio is at least 45 wt % cathode.

The solid-state battery can further include a reactive gas, by which is meant a compound that is a gas at any given temperature or pressure, and that will react chemically or electrochemically with solid-state electrolyte material or an electrode (cathode or anode) active material. In one embodiment of the present disclosure, the reactive gas can include compounds having at least one oxygen atom (e.g., $CO_2$, CO, $O_2$, $N_2O$, $NO_2$, and $SO_2$), at least one sulfur atom (e.g., $S_8$, COS, $CS_2$, $SF_6$, $H_2S$, $SO_2$, $CH_3SH$, $(CH_3)_2S$, and $C_2H_5SH$), and/or at least one chlorine atom (e.g., $Cl_2$, $CCl_4$, $CH_3CCl_3$, $CHClF_2$, $ClO_2$).

By virtue of its reaction with the solid-state electrolyte or electrode active material, the reactive gas may chemically or electrochemically produce a protective coating layer at an outer surface of one or more of the cathode active material, the anode active material, and/or the electrically-conductive material. In some embodiments, the reactive gas is removed from the solid-state battery using a vacuum source after conducting one or more formation cycles with exposure to the reactive gas, or after generating a desired protective coating layer at the surface of the cell components. The formation cycle can include a step of applying current or voltage to the battery either from the anode to the cathode or from the cathode to the anode. The resulting protective coating layer is expected to prevent, in part, direct contact with the solid-state electrolyte materials, and to reduce the charge transfer resistance between the electrode and the solid-state electrolyte materials by maximizing the contact area for ion transport without applying a significant amount of stack pressure. The reactive gas itself is not a cathode active material nor an anode active material, and the reactive gas should not participate in the redox reaction of the electrochemical cell during operation of the battery.

It should be appreciated that while the descriptions of the various embodiments herein are written in the context of a battery having a single cell, the same or similar principles may be applied to a battery assembly that includes more than one battery cell (i.e., battery packs, etc.). Such multiple-battery assemblies should be understood to fall within the scope of the present disclosure.

Example 1. Manufacture of a High-Energy Cathode

Cathodes according to the present disclosure are manufactured and tested using the following procedures.

Lithium hydroxide (LiOH) monohydrate and lithium chloride (LiCl) hydrate are dissolved in a 1:4 oxalic acid (OA)—methanol (MeOH) mixture with vigorous stirring to prepare a 0.1 M LiGH/0.1 M LiCl solution. 100 mg of carbon nanotube (CNT) is added to the solution with stirring, and the resulting mixture was ultrasonicated for 10 minutes to cause the carbon nanotube to interweave. A solution of hydrogen peroxide ($H_2O_2$) and carbamide peroxide ($CH_6N_2O_3$) was added dropwise to the reaction mixture at a temperature of 65° C., with vigorous stirring.

The reaction mixture is then transferred to a TEFLON-lined stainless-steel autoclave and heated to 130° C. for 12 hours. The resulting precipitate is separated from the mother liquor by filtration, washed with acetone and dried under vacuum at 110° C. for 24 hours. The collected material is then quickly transferred to an argon-filled glovebox with minimal exposure to air. The compositions of the as-prepared cathode active materials are expected to be one or more of the composite materials of $LiCl$—$Li_2O$ and $LiCl$—$Li_2O_2$, where the resulting clusters can be empirically described as $Li_3ClO$ and $Li_3ClO_2$, respectively.

Example 2. Manufacture of a Solid-State Electrolyte

The first solid-state electrolyte is prepared by using inverse vulcanization of elemental sulfur. The pre-dried elemental sulfur and 1,3-diisopropenylbenzene (DIB) are mixed in a weight ratio of 50:50 and stirred on a hot plate inside an argon-filled glovebox at 180° C. for about four hours. Upon changing color from yellow to red during the inverse vulcanization process, the mixture is then cooled to a room temperature overnight. The resulting material is then dissolved in chloroform with pre-dried LiCl and poly (ethylene oxide). The composition of the first solid-state electrolyte is expected to be a composite polymeric material of poly(S-r-DIB)—LiCl-PEO. A high porosity (90%) polybenzimidazole (PBI) nanofiber sheet (<15 μm in thickness) is then dipped into the resulting solution, dried for about an hour, and repeated at least three times to make sure the surface of the separator is fully covered. The resulting free-standing film can have a thickness of about 18 μm.

The second solid-state electrolyte precursors include pre-dried LiCl and LiGH. A few drops of methanol is added to a mixture of LiCl and LiGH to form a paste, and the resulting paste is introduced into a TEFLON reactor, which was firmly closed. The reactor was heated at 250° C. for 48 hours before it was opened. Then, it was allowed to cool to room temperature while a vacuum pump was used to remove water from the reactor. The composition of the as-prepared second solid-state electrolyte are expected to be $Li_{2-x}OHCl_{1-x}$, $Li_{3-x}OH_xCl$, and $Li_3ClO$, where $0<x<1$. The melting point of the solid state electrolyte is found to be less than 270° C. The resulting solid-state electrolyte is then placed in a stainless-steel drum container outer surface surrounded by heating elements and connected to stainless-steel tubing, where the inside of the container is filled with a pre-dried mixed gas comprising $CO_2$ and Ar. The concept of the solid electrolyte reservoir is expected to keep the manufacturing cost down for minimizing the manufacturing space volume with dew point less than –60° C.

Example 3. Manufacture of a Solid-State Electrochemical Cell

Figure 7:
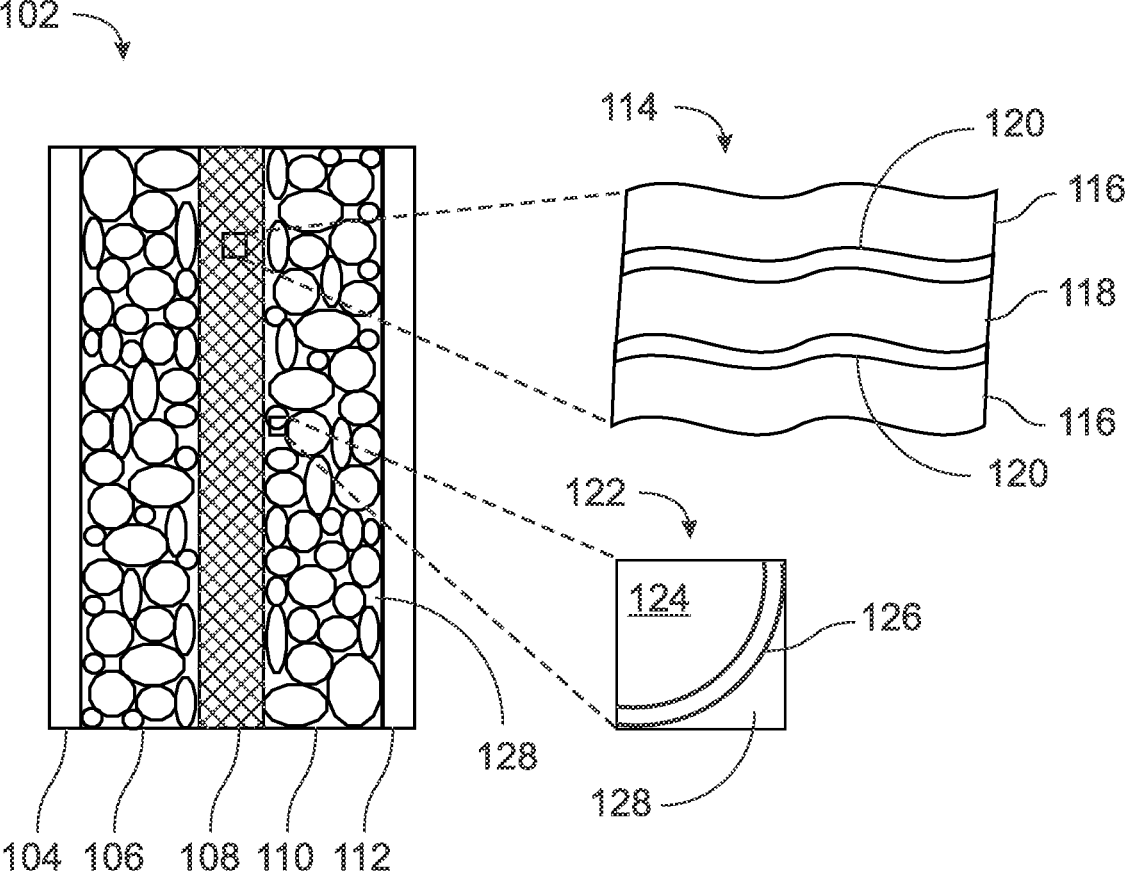
FIG. 7 is a schematic illustration showing selected details of an exemplary solid-state battery manufactured according to the present disclosure.

The cathode active materials are mixed with $Li_2C_6Cl_4O_2$ as additional cathode active material, carbon black as electrically-conductive material, succinonitrile as a plasticizer, and polytetrafluoroethylene as a polymeric binder. The resulting mixture is cast onto a 316L stainless-steel bipolar current collector to create a cathode 90 for battery cell 92. The prepared cathode is placed in a cylindrical cell with the first solid-state electrolyte coated PBI nanofiber separator 94 as shown in FIG. 7. After the assembly, the second solid-state electrolyte 96 in an external reservoir 98 is heated and liquified at above 300° C. and introduced into the as-assembled cell 92 using pump 100. The liquid electrolyte 96 infiltrates the pores of the separator and the electrodes, and then upon cooling to room temperature is converted back to the solid phase. Inert $CO_2$ is added to reservoir 98 and is introduced into cell 90 along with the second solid-state electrolyte 96 and is expected to produce a protective layer on the outer surface of the electrode materials to avoid in part direct contact with the solid-state electrolyte materials and to reduce the charge transfer resistance between the electrode and the solid-state electrolyte materials. After one or more of formation cycles applying current or voltage to the cell, the remaining $CO_2$ can be removed from the cell housing, using for example, a vacuum source (e.g., vacuum pump) coupled to a port through the housing.

An enlarged section 102 of the structure of cell 92 is shown in FIG. 7. Sample section 102 includes, from left to right, anode current collector 104, anode 106, electrolytic separator 108, cathode 110, and cathode current collector 112. Similarly, an enlarged section 114 of electrolytic separator 108 shows a structure including solid glass electrolyte 116 surrounding a heat-resistant polymer 118, but separated from the polymer 118 by solid polymer electrolyte 120.

Similarly, an enlarged section 122 of cathode 110 shows particles of electrode material 124 surrounded by a protective layer 126 disposed within the solid state electrolyte 128.

Example 4. Determining the Rechargeability of the High-Energy Battery

Figure 8:
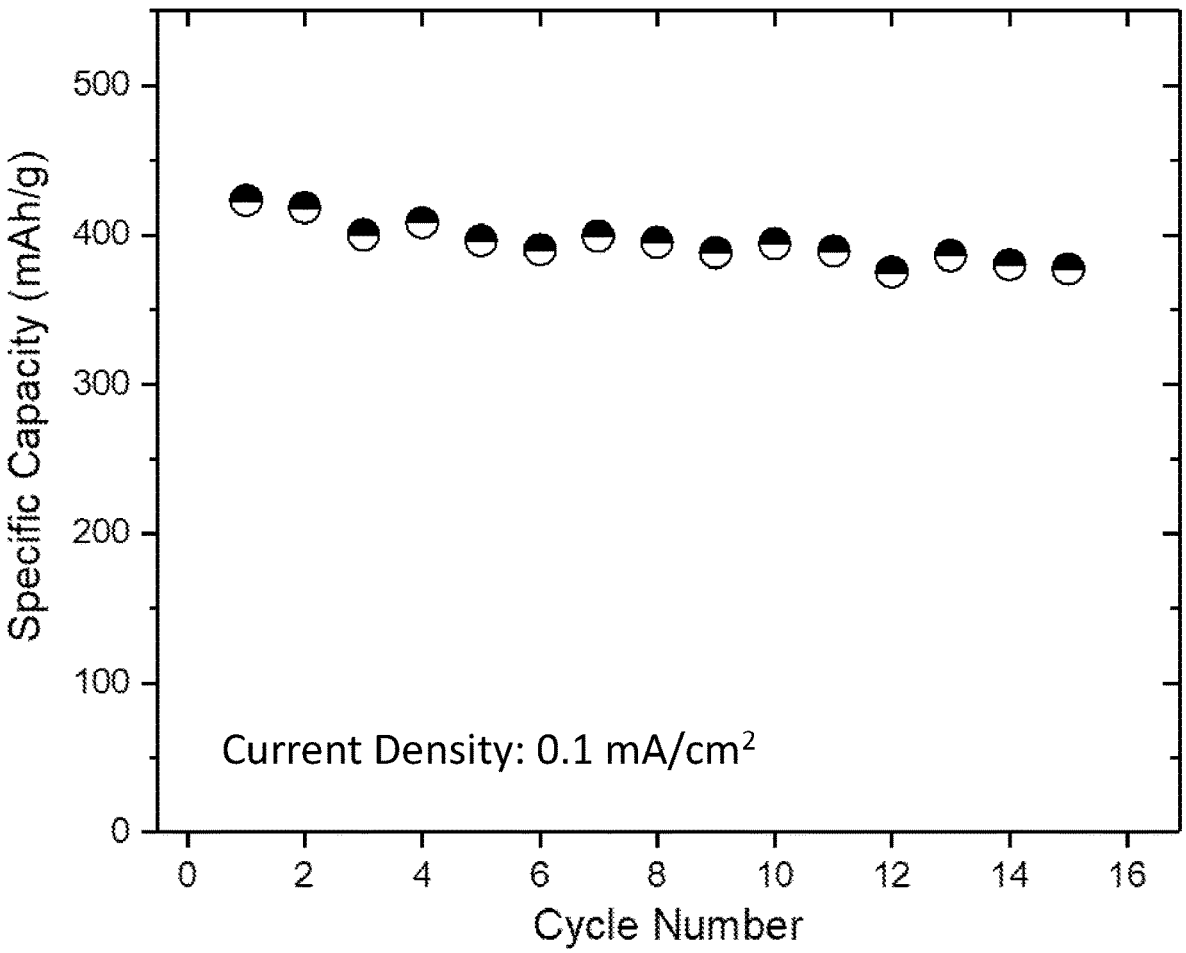
FIG. 8 is a plot demonstrating the advantageously high rechargeability of an illustrative battery according to the present disclosure.

The high-energy battery prepared in Example 3 is subjected to repeated discharge and recharge. As shown in FIG. 8, the battery maintained a high capacity over 15 cycles at a current density of 0.1 $mA/cm^2$.

Example 5. Additional Selected Embodiments

This section describes additional aspects and features of the disclosed cathode active materials, cathodes, and batteries presented without limitation as a series of paragraphs, some, or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A solid-state battery, comprising: an electrolyte including an electrolyte material; wherein at least a portion of the electrolyte material is solid, and the solid portion of the electrolyte material includes a first chlorine compound; and a cathode that is in contact with the electrolyte; wherein the cathode includes a cathode active material that includes a second chlorine compound.

A2. The solid-state battery of paragraph A1, wherein the battery is configured so that the first chlorine compound and the second chlorine compound are identical.

A3. The solid-state battery of paragraph A1, wherein the battery is configured so that the first chlorine compound is electrochemically converted into the second chlorine compound, and the second chlorine compound is electrochemically converted into the first chlorine compound.

A4. The solid-state battery of paragraph A1, wherein the solid portion of the electrolyte material includes sulfur.

A5. The solid-state battery of paragraph A4, wherein the solid portion of the electrolyte material is made via inverse vulcanization of sulfur.

A6. The solid-state battery of paragraph A1, wherein the first chlorine compound has a melting point of less than 700° C.

A7. The solid-state battery of paragraph A1, wherein the second chlorine compound includes a metal complex of chlorine.

A8. The solid-state battery of paragraph A1, wherein the cathode active material includes one or more metals selected from lithium, sodium, potassium, beryllium, magnesium, calcium, vanadium, iron, nickel, copper, zinc, or aluminum.

A9. The solid-state battery of paragraph A8, wherein the solid-state battery is configured so that charging the solid-state battery oxidizes a metal of the cathode active material to a metal ion, and the metal ion is then transported via the electrolyte.

A10. The solid-state battery of paragraph A1, wherein the cathode active material includes an organic compound and/or an organic moiety.

A11. The solid-state battery of paragraph A1, wherein the cathode further comprises an electrically-conductive material that is in contact with the cathode active material.

A12. The solid-state battery of paragraph A11, wherein the electrically-conductive material and/or the cathode active material includes a protective coating layer.

A13. The solid-state battery of paragraph A11, wherein the electrically-conductive material includes a porous carbon material selected from carbon black, carbon nanotubes, carbon nanofibers, carbon dots, activated carbon, graphite, graphene, graphene oxide, and graphene nanoribbons.

A14. The solid-state battery of paragraph A13, wherein the porous carbon material is doped with one or more heteroatoms independently selected from boron, oxygen, nitrogen, sulfur, phosphorous, fluorine, chlorine, and bromine.

A15. The solid-state battery of paragraph A1, wherein the cathode further includes one or more of a polymeric binder, a plasticizer, or a carboxylic acid.

A16. The solid-state battery of paragraph A1, further comprising an anode that includes an anode active material.

A17. The solid-state battery of paragraph A1, further comprising a reactive gas that is in contact with the electrolyte or dissolved in the electrolyte.

A18. The solid-state battery of paragraph A17, wherein the reactive gas includes oxygen, chlorine, and/or sulfur.

A19. The solid-state battery of paragraph A17, wherein the reactive gas includes one or more of $CO_2$, $CO$, $Cl_2$, $CCl_4$, $CH_3CCl_3$, $CHClF_2$, $ClO_2$, $O_2$, $N_2O$, $NO_2$, $SO_2$, $S_8$, $COS$, $CS_2$, $SF_6$, $H_2S$, $SO_2$, $CH_3SH$, $(CH_3)_2S$, and $C_2H_5SH$.

A20. The solid-state battery of paragraph A1, further comprising a bipolar current collector, wherein the bipolar current collector includes an alloy of one or more of molybdenum, titanium, and zirconium.

A21. The solid-state battery of paragraph A1, further comprising a separator, wherein the separator includes an electrically-insulating material.

A22. The solid-state battery of paragraph A21, wherein the electrically-insulating material of the separator has a melting point greater than 200° C.

A23. The solid-state battery of paragraph A21, wherein the electrically-insulating material of the separator has a porosity greater than 50%.

A24. The solid-state battery of paragraph A1, wherein the solid electrolyte material has a mass percentage of chlorine that is greater than 3.

A25. The solid-state battery of paragraph A1, wherein the second chlorine compound has a mass percentage of chlorine that is greater than 5.

A26. A solid-state battery, comprising: an electrolyte including an electrolyte material; wherein at least a portion of the electrolyte material is solid, and the solid portion of the electrolyte material is made via inverse vulcanization of sulfur, and a cathode that is in contact with the electrolyte; wherein the cathode includes a cathode active material.

ADVANTAQES, FEATURES, BENEFITS

The solid-state batteries equipped with the cathode active materials and the solid-state electrolyte materials of the present disclosure permit the fabrication of high-energy density cells that are economical, provide high discharge capacities, and high discharge potentials.

Selected batteries of the present disclosure can produce at least 2.0 V of average operating discharge potential versus Li/Li$^+$ at a current density of greater than or equal to 0.1 mA/cm$^2$.

Selected batteries of the present disclosure exhibit discharge specific capacities of at least 200 mAh/g, based on the amount of the first and second cathode active materials, at a current density of greater than or equal to 0.1 mA/cm$^2$.

In some embodiments, the batteries of the present disclosure can exhibit discharge specific capacities of greater than 200 mAh/g, greater than 300 mAh/g, and greater than 400 mAh/g, based on the amount of the cathode active material, at current densities of greater than or equal to 0.1 mA/cm$^2$.

Selected batteries of the present disclosure can exhibit average operating discharge potentials greater than 1.0 V versus Li/Li+. In some embodiments, the batteries of the present disclosure can exhibit average operating discharge potentials greater than 2.0 V, greater than 3.0 V, or even greater than 4.0 V, versus Li/Li+. Typically, such batteries may produce an average operating discharge potential of at least 3.0 V versus Li/Li+ at a current density of greater than or equal to 0.1 mA/cm$^2$.

Selected batteries of the present disclosure, together with the high discharge capacities and high discharge potentials, can provide high cell-level energy density of greater than 500 Wh/kg with low cell-level cost of less than $50/kWh.

Selected batteries of the present disclosure, including those having a first cathode active material and a second cathode active material, may be substantially rechargeable. In one aspect of the disclosure, a battery may be considered substantially rechargeable if it exhibits a cycle number greater than 100. Alternatively, or in addition, selected batteries of the present disclosure, including those having a first cathode active material and a second cathode active material, may operate efficiently at room temperature, which in one embodiment may be defined as 15° C.-30° C.

The cathode active material of the present disclosure exhibits a standard redox potential above 3.0 V versus Li/Li+.

The term "combination" or "combinations" means, unless otherwise stated, all types of combinations, starting from two of the relevant constituents, to a plurality or all such constituents.

The illustration of the steps of a method, whether shown in the drawings or described in the description, should not be considered to illustrate the specific order of the method steps, unless the order is specifically provided. The order of such steps may differ from what is depicted and described, and/or two or more steps may be performed concurrently or with partial concurrence, unless specified differently.

The features and variants specified in the individual embodiments and examples can be freely combined with those of the other examples and embodiments and be used to characterize the invention in the claims without necessarily implying the other details of the respective embodiment or the respective example.

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and sub-combinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A solid-state battery, comprising:
an electrolyte including an electrolyte material; wherein at least a portion of the electrolyte material is a solid, and the solid portion of the electrolyte material includes a first chlorine compound; and
a cathode that is in contact with the electrolyte; wherein the cathode includes a cathode active material that includes a second chlorine compound;
wherein the first chlorine compound and the second chlorine compound are identical.

2. The solid-state battery of claim 1, wherein the solid portion of the electrolyte material includes sulfur.

3. The solid-state battery of claim 2, wherein the solid portion of the electrolyte material is made via inverse vulcanization of sulfur.

4. The solid-state battery of claim 1, wherein the first chlorine compound has a melting point of less than 700° C.

5. The solid-state battery of claim 1, wherein the cathode active material includes one or more metals selected from lithium, sodium, potassium, beryllium, magnesium, calcium, vanadium, iron, nickel, copper, zinc, or aluminum.

6. The solid-state battery of claim 5, wherein the solid-state battery is configured so that charging the solid-state battery oxidizes a metal of the cathode active material to a metal ion, and the metal ion is then transported via the electrolyte.

7. The solid-state battery of claim 1, wherein the cathode active material includes an organic compound and/or an organic moiety.

8. The solid-state battery of claim 1, wherein the cathode further comprises an electrically-conductive material that is in contact with the cathode active material.

9. The solid-state battery of claim 8, wherein at least one of the electrically-conductive material or the cathode active material includes a protective coating layer.

10. The solid-state battery of claim 1, further comprising an anode that includes an anode active material.

11. The solid-state battery of claim 1, further comprising a reactive gas that is in contact with the electrolyte or is dissolved in the electrolyte.

12. The solid-state battery of claim 1, further comprising a bipolar current collector, wherein the bipolar current collector includes an alloy of one or more of molybdenum, titanium, and zirconium.

13. The solid-state battery of claim 1, wherein the solid electrolyte material has a mass percentage of chlorine that is greater than 3.

14. The solid-state battery of claim 1, wherein the second chlorine compound has a mass percentage of chlorine that is greater than 5.

15. A solid-state battery, comprising:
an electrolyte including an electrolyte material; wherein at least a portion of the electrolyte material is solid, and the solid portion of the electrolyte material includes linear sulfur chains interspersed with organic linkers made via inverse vulcanization of sulfur; and
a cathode that is in contact with the electrolyte; wherein the cathode includes a cathode active material.

* * * * *